(12) United States Patent
Herlant et al.

(10) Patent No.: US 12,306,633 B2
(45) Date of Patent: May 20, 2025

(54) SYSTEMS AND METHODS FOR DOCK PLACEMENT FOR AN AUTONOMOUS MOBILE ROBOT

(71) Applicant: iRobot Corporation, Bedford, MA (US)

(72) Inventors: Laura V. Herlant, Arlington, MA (US); Brent Hild, Bedford, MA (US); Ryan Schneider, Burlington, MA (US); Benjamin Glazer, Acton, MA (US)

(73) Assignee: iRobot Corporation, Bedford, MA (US)

( * ) Notice: Subject to any disclaimer, the term of this patent is extended or adjusted under 35 U.S.C. 154(b) by 163 days.

(21) Appl. No.: 18/132,592

(22) Filed: Apr. 10, 2023

(65) Prior Publication Data
US 2023/0244240 A1    Aug. 3, 2023

Related U.S. Application Data

(63) Continuation of application No. 17/134,658, filed on Dec. 28, 2020, now Pat. No. 11,662,737.

(51) Int. Cl.
*G05D 1/00* (2024.01)

(52) U.S. Cl.
CPC ......... *G05D 1/0225* (2013.01); *G05D 1/0227* (2013.01); *G05D 1/0246* (2013.01)

(58) Field of Classification Search
CPC ... G05D 1/0225; G05D 1/0227; G05D 1/0246
See application file for complete search history.

(56) References Cited

U.S. PATENT DOCUMENTS

| 11,662,737 B2 | 5/2023 | Herlant et al. |
| 2016/0166126 A1 | 6/2016 | Morin et al. |
| (Continued) | | |

FOREIGN PATENT DOCUMENTS

| JP | H036899 | 1/1991 |
| JP | H0921307 | 1/1997 |
| (Continued) | | |

OTHER PUBLICATIONS

U.S. Appl. No. 17/134,658, filed Dec. 28, 2020, Systems and Methods for Dock Placement for an Autonomous Mobile Robot (as amended).

(Continued)

*Primary Examiner* — Hunter B Lonsberry
*Assistant Examiner* — Harrison Heflin
(74) *Attorney, Agent, or Firm* — Schwegman Lundberg & Woessner, P.A.

(57) ABSTRACT

Described herein are systems, devices, and methods for validating location of a docking station for docking a mobile robot. In an example, a mobile robot system includes a docking station and a mobile cleaning robot. The mobile cleaning robot includes a drive system to move the mobile cleaning robot about an environment including a docking area within a distance of the docking station, and a controller circuit to detect, from an image of the docking area, a presence or absence of one or more obstacles in the docking area. A notification may be generated to inform a user about the detected obstacles. The mobile device may generate a recommendation to the user to clear the docking area or reposition the docking station, or suggest one or more candidate locations for placing the docking station.

20 Claims, 17 Drawing Sheets

(56) References Cited

U.S. PATENT DOCUMENTS

| | | | |
|---|---|---|---|
| 2018/0055326 A1 | 3/2018 | Jung | |
| 2018/0299899 A1 | 10/2018 | Suvarna et al. | |
| 2019/0018424 A1* | 1/2019 | Hillen | G01S 17/931 |
| 2019/0194913 A1 | 6/2019 | Petrany et al. | |
| 2019/0385042 A1* | 12/2019 | Lee | G05D 1/0225 |
| 2020/0019156 A1 | 1/2020 | Drew et al. | |
| 2020/0069139 A1 | 3/2020 | Johnson et al. | |
| 2020/0387164 A1 | 12/2020 | Chae et al. | |
| 2021/0094180 A1 | 4/2021 | Szafir et al. | |
| 2021/0393099 A1* | 12/2021 | Zhao | A47L 9/2852 |
| 2022/0206507 A1 | 6/2022 | Herlant et al. | |

FOREIGN PATENT DOCUMENTS

| | | |
|---|---|---|
| JP | H0971046 | 3/1997 |
| JP | 2016134081 | 7/2016 |
| JP | 2017536938 | 12/2017 |
| JP | 6429639 B2 * | 11/2018 |
| JP | 2019121364 | 7/2019 |
| JP | 2019526857 | 9/2019 |
| WO | WO-2019173396 A1 | 9/2019 |
| WO | WO-2022146556 A1 | 7/2022 |

OTHER PUBLICATIONS

"U.S. Appl. No. 17/134,658, Examiner Interview Summary mailed Dec. 6, 2022", 2 pgs.

"U.S. Appl. No. 17/134,658, Non Final Office Action mailed Sep. 15, 2022", 28 pgs.

"U.S. Appl. No. 17/134,658, Notice of Allowance mailed Jan. 3, 2023", 9 pgs.

"U.S. Appl. No. 17/134,658, Response filed Nov. 30, 2022 to Non Final Office Action mailed Sep. 15, 2022", 21 pgs.

"International Application Serial No. PCT/US2021/058194, International Search Report mailed Feb. 8, 2022", 5 pgs.

"International Application Serial No. PCT/US2021/058194, Written Opinion mailed Feb. 8, 2022", 7 pgs.

"International Application Serial No. PCT US2021 058194, International Preliminary Report on Patentability mailed Jul. 13, 2023", 9 pgs.

"European Application Serial No. 21816256.8, Communication Pursuant to Article 94(3) EPC mailed Nov. 15, 2024", 6 pgs.

"Japanese Application Serial No. 2023-539367, Notification of Reasons for Rejection mailed Jan. 28, 2025", W English Translation, 12 pgs.

* cited by examiner

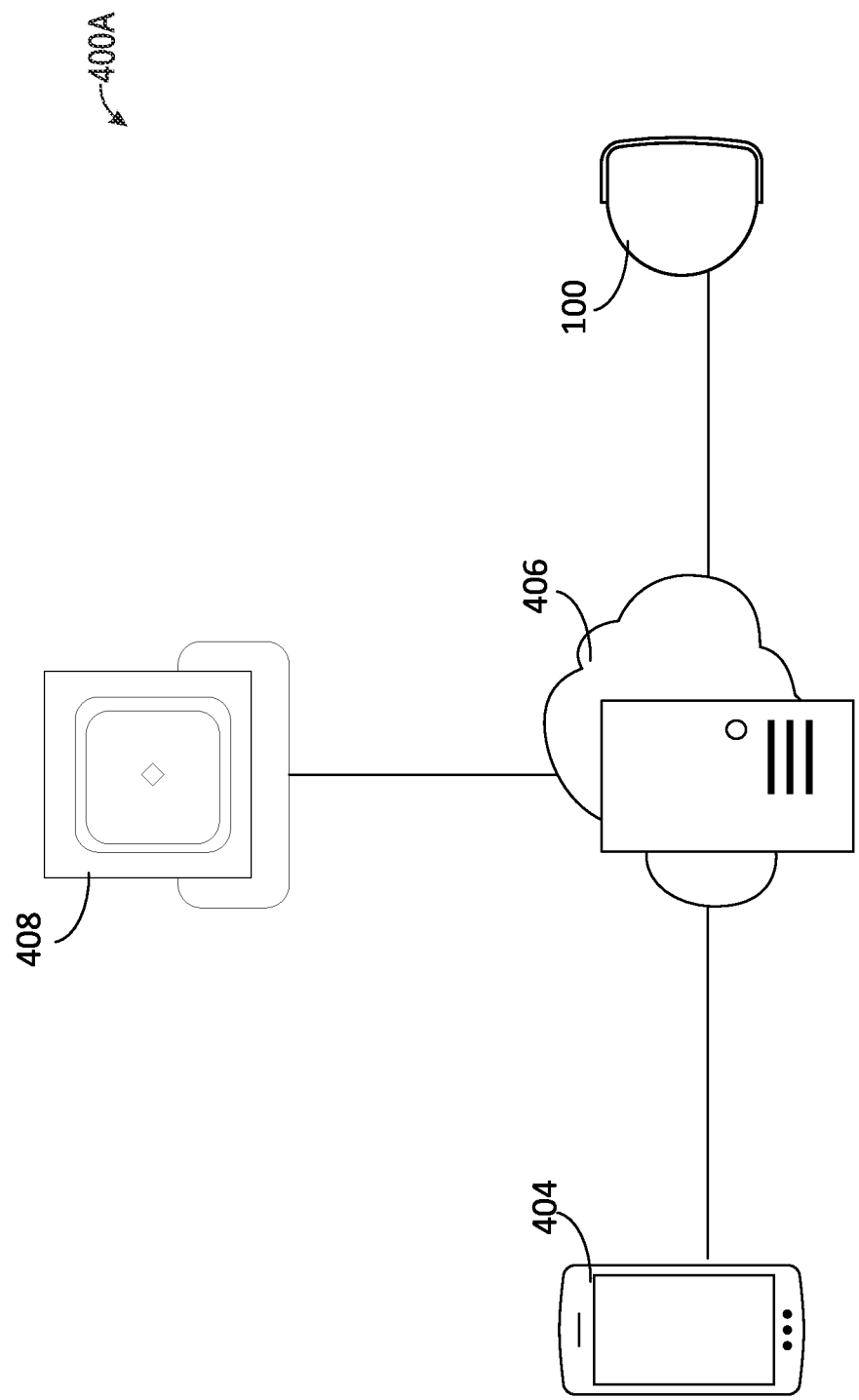

SYSTEMS AND METHODS FOR DOCK PLACEMENT FOR AN AUTONOMOUS MOBILE ROBOT

PRIORITY APPLICATIONS

This application is a continuation of U.S. patent application Ser. No. 17/134,658, filed Dec. 28, 2020, the content of which is incorporated herein by reference in its entirety.

TECHNICAL FIELD

This document relates generally to mobile robots and, more particularly, to systems, devices, and methods for validating a dock location for docking a mobile robot.

BACKGROUND

Autonomous mobile robots can move about an environment, and perform several functions and operations in a variety of categories, including but not limited to security operations, infrastructure or maintenance operations, navigation or mapping operations, inventory management operations, and robot/human interaction operations. Some mobile robots, known as cleaning robots, can autonomously perform cleaning tasks within an environment, e.g., a home. Many kinds of cleaning robots are autonomous to some degree and in different ways. For example, a cleaning robot can conduct cleaning missions, where the robot traverses and simultaneously ingests (e.g., vacuums) debris from the floor surface of their environment.

Some mobile robots are capable of performing self-charging at a docking station (also referred to as a robot dock or a dock) located in the environment (e.g., the user's home) whenever the battery level reaches a low enough value. Some mobile robots can temporarily store debris in a debris bin associated with the mobile robot, and empty the debris into a receptacle of the docking station when docked. A mobile robot can detect the docking station and navigate until docked. The mobile robot may then engage with charging contacts on the docking state to charge the battery, and/or to empty bin.

SUMMARY

This document describes systems, devices, and methods for automatically validating a dock location for docking a mobile robot. The validation is to ensure that the docking area is free of obstacles that would obstruct or interfere with the mobile robot's docking behavior. In accordance with various examples, a mobile robot system is provided that includes a docking station and a mobile cleaning robot. The mobile cleaning robot includes a drive system to move the mobile cleaning robot about an environment including a docking area within a distance of the docking station, and a controller circuit to detect a presence or absence of one or more obstacles in the docking area from an image of the docking area, such as one taken by a camera associated with the mobile cleaning robot or by a camera on a mobile device. A notification or alert may be generated to inform a user about the detected obstacles in the docking area, or if the docking station becomes misplaced over time such as due to an object (e.g., furniture) in the environment being moved. A recommendation to clear the docking area or reposition the docking station may be presented to the user on a mobile device. In some examples, the mobile device may automatically suggest one or more alternative locations for placing the docking station.

Example 1 is a mobile robot system that comprises: a docking station; and a mobile cleaning robot including: a drive system configured to move the mobile cleaning robot about an environment including a docking area within a distance of the docking station; and a controller circuit configured to: receive an image of the docking area; detect from the received image a presence or absence of one or more obstacles in the docking area; and generate a notification to a user about the detected presence of absence of one or more obstacles.

In Example 2, the subject matter of Example 1 optionally includes the mobile cleaning robot that can include an imaging sensor configured to generate the image of the docking area.

In Example 3, the subject matter of any one or more of Examples 1-2 optionally includes the controller circuit that can be configured to receive the image of the docking area from a mobile device operatively in communication with the mobile cleaning robot, the mobile device including an imaging sensor configured to generate the image of the docking area.

In Example 4, the subject matter of any one or more of Examples 1-3 optionally includes the controller circuit that can be configured to detect the presence or absence of one or more obstacles in the docking area based on a comparison of the image of the docking area and a stored image of the docking area free of obstacles.

In Example 5, the subject matter of any one or more of Examples 1-4 optionally includes the mobile cleaning robot that can include at least one sensor including a bump sensor, an optical sensor, a proximity sensor, or an obstacle sensor, and wherein the control circuit is configured to detect the presence or absence of one or more obstacles in the docking area further based on a signal sensed by the at least one sensor.

In Example 6, the subject matter of any one or more of Examples 1-5 optionally includes a mobile device operatively in communication with the mobile cleaning robot, the mobile device configured to: present to the user the notification about the detected one or more obstacles; and generate a recommendation to the user to clear the docking area or to reposition the docking station in response to the presence of one or more obstacles in the docking area.

In Example 7, the subject matter of Example 6 optionally includes the mobile device that can be configured to: generate a graph representing docking failure rates at respective sites around a present location of the docking station when one or more of the respective sites are occupied by an obstacle; and display the graph on a map of the environment; wherein the recommendation to clear the docking area or to reposition the docking station is based on the graph.

In Example 8, the subject matter of Example 7 optionally includes the mobile device that can be configured to: compute a docking failure score based on the graph; and generate the recommendation to clear the docking area or to reposition the docking station if the docking failure score exceeds a threshold.

In Example 9, the subject matter of any one or more of Examples 6-8 optionally includes the mobile device that can be configured to: present to the user one or more candidate locations of the docking station on a map of the environment; and receive a user selection from the one or more candidate locations for placement of the docking station.

In Example 10, the subject matter of Example 9 optionally includes the mobile device that can be configured to: for each of one or more candidate locations of the docking station, generate a graph representing docking failure rates at respective sites around a corresponding candidate location when one or more of the respective sites are occupied by an obstacle; and display, on a map of the environment, the graphs corresponding to the one or more candidate locations.

In Example 11, the subject matter of Example 10 optionally includes the mobile device that can be configured to: compute docking failure scores respectively from the graphs corresponding to the one or more candidate locations; and present to the user a recommended location based on the docking failure scores corresponding to the one or more candidate locations.

In Example 12, the subject matter of any one or more of Examples 6-11 optionally includes the mobile device that can be configured to: receive an image of the docking station and information about operating status of the docking station; and generate an augmented reality representation comprising a machine-generated operating status indicator of the docking station overlaying upon the image of the docking station.

In Example 13, the subject matter of Example 12 optionally includes the operating status of the docking station that can include a status of an evacuation unit included in the docking station and configured to extract debris from the mobile cleaning robot.

In Example 14, the subject matter of any one or more of Examples 6-13 optionally includes the mobile device that can be configured to: receive an image of the mobile cleaning robot and information about operating status of the mobile cleaning robot; and generate an augmented reality representation comprising a machine-generated operating status indicator of the mobile cleaning robot overlaying upon the image of the mobile cleaning robot.

In Example 15, the subject matter of Example 14 optionally includes the operating status of the mobile cleaning robot that can include respective status of one or more of a debris bin, a filter, a sensor, or a battery of the mobile cleaning robot.

Example 16 is a mobile robot system, comprising: a mobile cleaning robot including: a controller circuit; and a drive system configured to move the mobile cleaning robot about an environment including a docking area around a docking station; and a mobile device operatively in communication with the mobile cleaning robot and configured to generate, and display to a user, an augmented reality (AR) representation of the docking area, the AR representation comprising a machine-generated virtual bounding box overlaying upon an image of the docking area, the machine-generated virtual bounding box defining a docking clearance zone around the docking station.

In Example 17, the subject matter of Example 16 optionally includes the mobile device that can be configured to: detect from the image of the docking area a presence or absence of one or more obstacles; and display the machine-generated virtual bounding box in a first color or render style if the one or more obstacles are present within the machine-generated virtual bounding box, or in a different second color or render style if no obstacle is present within the machine-generated virtual bounding box.

In Example 18, the subject matter of any one or more of Examples 16-17 optionally includes the mobile device that can be configured to, in response to a presence of one or more obstacles in the machine-generated virtual bounding box, generate a recommendation to the user to clear the docking area or to reposition the docking station.

In Example 19, the subject matter of any one or more of Examples 16-18 optionally includes the mobile device that can be configured to: detect, in the docking area, a status of a wireless communication signal for data communication between the mobile cleaning robot and one or more of the docking station or the mobile device; present the wireless communication signal status to the user; and generate a recommendation to the user to clear the docking area or to reposition the docking station if the wireless communication signal status satisfies a signal strength condition.

In Example 20, the subject matter of Example 19 optionally includes the wireless communication signal status that can include an indicator of Wi-Fi signal strength.

Example 21 is a non-transitory machine-readable storage medium that includes instructions that, when executed by one or more processors of a machine, cause the machine to perform operations comprising: receiving an image of a docking area within a distance of a docking station for docking a mobile cleaning robot in an environment; detecting from the received image a presence or absence of one or more obstacles in the docking area; and generating a notification to a user about the detected presence of absence of one or more obstacles.

In Example 22, the subject matter of Example 21 optionally includes the instructions causing the machine to perform operations further comprising: receiving a signal sensed by at least one sensor associated with the mobile cleaning robot, the at least one sensor including a bump sensor, an optical sensor, a proximity sensor, or an obstacle sensor; and detecting the presence or absence of one or more obstacles in the docking area further based on the signal sensed by the at least one sensor.

In Example 23, the subject matter of any one or more of Examples 21-22 optionally includes the operation of detecting the presence or absence of one or more obstacles in the docking area including comparing the image of the docking area to a stored image of the docking area free of obstacles.

In Example 24, the subject matter of any one or more of Examples 21-23 optionally includes the instructions causing the machine to perform operations further comprising, in response to a detection of a presence of one or more obstacles in the docking area, generating a recommendation to the user to clear the docking area or to reposition the docking station.

In Example 25, the subject matter of any one or more of Examples 21-24 optionally includes the instructions causing the machine to perform operations further comprising: generating a graph representing docking failure rates at respective sites around a present location of the docking station when one or more of the respective sites are occupied by an obstacle; displaying the graph on a map of the environment; and generating a recommendation to the user to clear the docking area or to reposition the docking station to a different location based on the graph.

In Example 26, the subject matter of Example 25 optionally includes the instructions causing the machine to perform operations further comprising computing a docking failure score based on the graph, wherein the operation of generating the recommendation to clear the docking area or to reposition the docking station is performed in response to the docking failure score exceeding a threshold.

In Example 27, the subject matter of any one or more of Examples 21-26 optionally includes the instructions causing the machine to perform operations further comprising: presenting to the user one or more candidate locations of the docking station on a map of the environment; and receiving a user selection from the one or more candidate locations for placement of the docking station.

In Example 28, the subject matter of Example 27 optionally includes the instructions causing the machine to perform operations further comprising: for each of the one or more candidate locations of the docking station, generating a graph representing docking failure rates at respective sites around a corresponding candidate location when one or more of the respective sites are occupied by an obstacle; and displaying, on a map of the environment, the graphs corresponding to the one or more candidate locations.

In Example 29, the subject matter of Example 28 optionally includes the instructions causing the machine to perform operations further comprising: computing docking failure scores respectively from the graphs corresponding to the one or more candidate locations; and presenting to the user a recommended location based on the docking failure scores corresponding to the one or more candidate locations.

In Example 30, the subject matter of any one or more of Examples 21-29 optionally includes the instructions causing the machine to perform operations further comprising generating, and displaying to a user, an augmented reality (AR) representation of the docking area, the AR representation comprising a machine-generated virtual bounding box overlaying upon the image of the docking area, the machine-generated virtual bounding box defining a docking clearance zone around the docking station.

In Example 31, the subject matter of Example 30 optionally includes the operation of generating and displaying the AR representation that can include displaying the machine-generated virtual bounding box in a first color or render style if the one or more obstacles are present within the machine-generated virtual bounding box, or in a different second color or render style if no obstacle is present within the machine-generated virtual bounding box.

In Example 32, the subject matter of any one or more of Examples 30-31 optionally includes the instructions causing the machine to perform operations further comprising: detecting, in the docking area, a status of a wireless communication signal for data communication between the mobile cleaning robot and one or more of the docking station or a mobile device; presenting the wireless communication signal status to the user; and generating a recommendation to the user to clear the docking area or to reposition the docking station if the wireless communication signal status satisfies a signal strength condition.

This summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIG. 4A is a diagram illustrating an example of a communication network in which a mobile cleaning robot operates and data transmission in the network.

DETAILED DESCRIPTION

An autonomous mobile robot may be controlled locally or remotely to execute a mission, such as a cleaning mission involving rooms or floor surface areas to be cleaned by a mobile cleaning robot. A user may use a remote control device to display a map of the environment, create a cleaning mission on a user interface (UI) of the remote control device, control the mobile robot to execute the cleaning mission. The mobile robot may perform self-charging at a docking station located in the environment whenever the battery level reaches a low enough value. Additionally, in some examples, the docking station may be an evacuation station that includes a receptacle to extract debris collected by and stored in the mobile robot. A mobile robot can detect the docking station and navigate until docked.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

In the following, mobile robot and its working environment are briefly discussed with reference to FIGS. 1-4.

Detailed descriptions of systems, devices, mobile applications, and methods of scheduling and controlling a mobile robot based on contextual information and user experience, in accordance with various embodiments described herein, are discussed with reference to FIGS. 5 to 11.

Examples of Autonomous Mobile Robots

Figure 1:
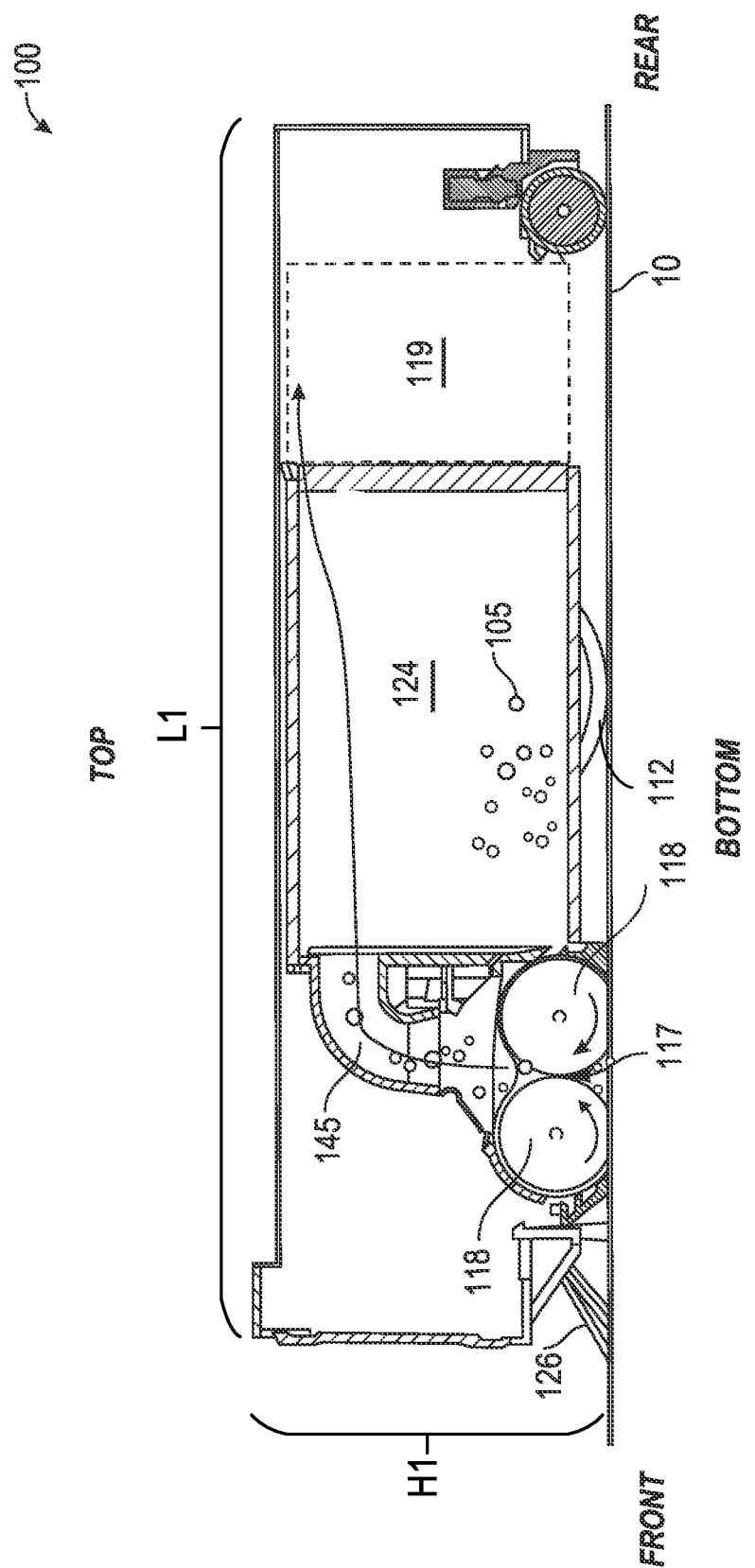
FIGS. 1, 2A, and 2B are side cross-sectional, bottom, and top perspective views of a mobile robot.
Figure 2A:
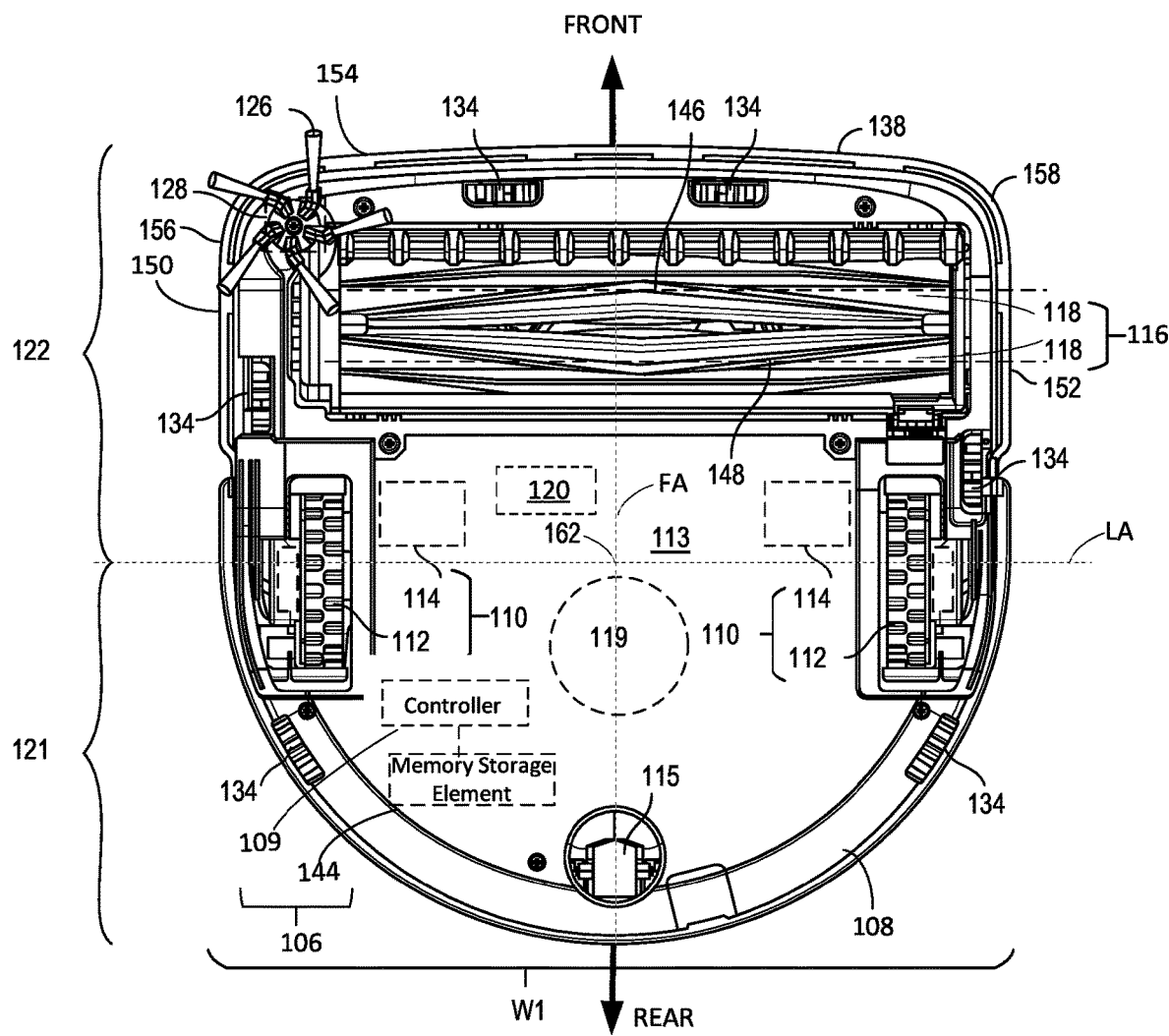
Figure 2B:
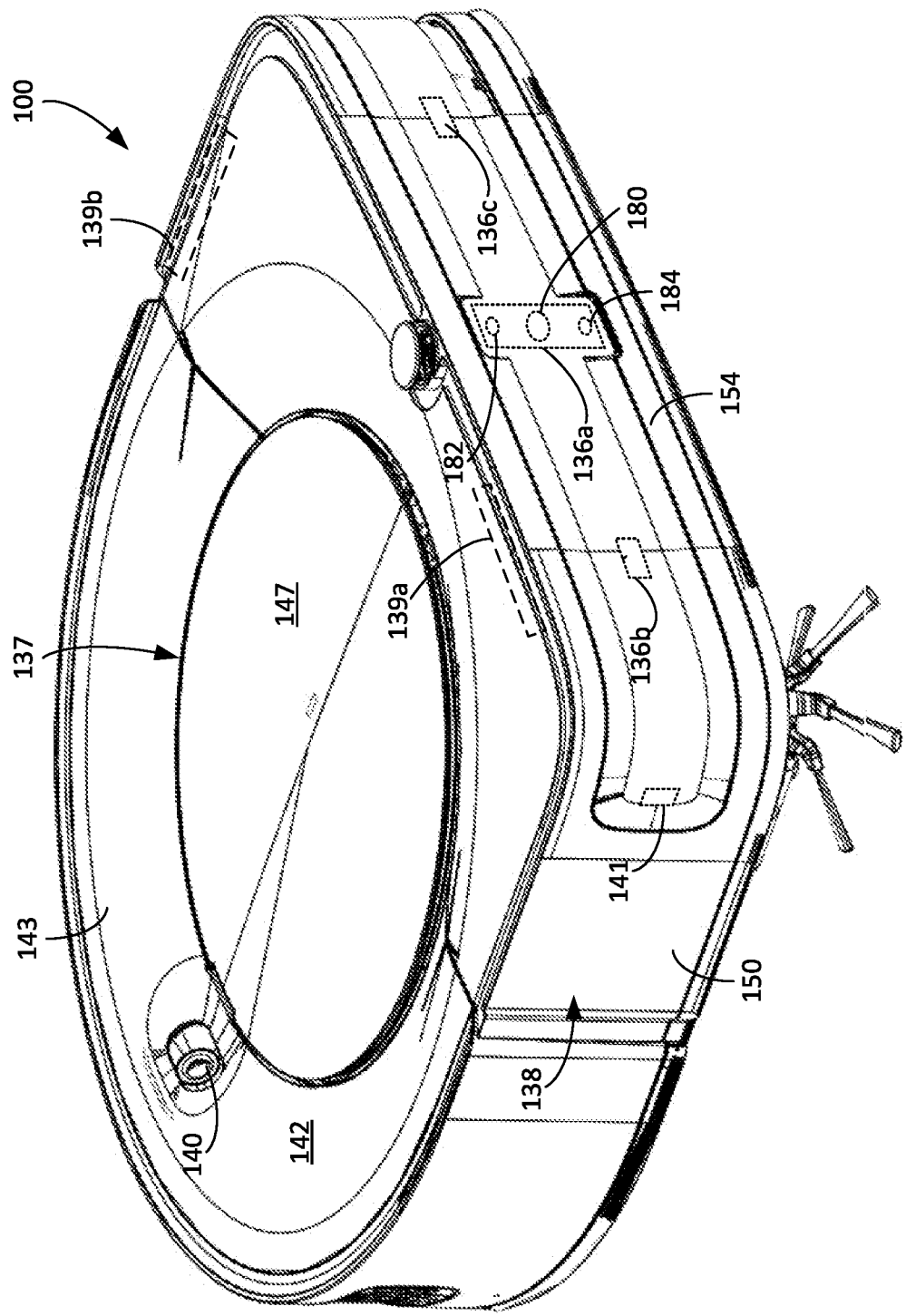

FIGS. 1 and 2A-2B depict different views of an example of a mobile robot 100. Referring to FIG. 1, the mobile robot 100 collects debris 105 from the floor surface 10 as the mobile robot 100 traverses the floor surface 10. Referring to FIG. 2A, the mobile robot 100 includes a robot housing infrastructure 108. The housing infrastructure 108 can define the structural periphery of the mobile robot 100. In some examples, the housing infrastructure 108 includes a chassis, cover, bottom plate, and bumper assembly. The mobile robot 100 is a household robot that has a small profile so that the mobile robot 100 can fit under furniture within a home. For example, a height H1 (shown in FIG. 1) of the mobile robot 100 relative to the floor surface is, for example, no more than 13 centimeters. The mobile robot 100 is also compact. An overall length L1 (shown in FIG. 1) of the mobile robot 100 and an overall width W1 (shown in FIG. 2A) are each between 30 and 60 centimeters, e.g., between 30 and 40 centimeters, 40 and 50 centimeters, or 50 and 60 centimeters. The overall width W1 can correspond to a width of the housing infrastructure 108 of the mobile robot 100.

The mobile robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller circuit 109, within the mobile robot 100.

The drive system 110 is operable to propel the mobile robot 100 across the floor surface 10. The mobile robot 100 can be propelled in a forward drive direction F or a rearward drive direction R. The mobile robot 100 can also be propelled such that the mobile robot 100 turns in place or turns while moving in the forward drive direction F or the rearward drive direction R. In the example depicted in FIG. 2A, the mobile robot 100 includes drive wheels 112 extending through a bottom portion 113 of the housing infrastructure 108. The drive wheels 112 are rotated by motors 114 to cause movement of the mobile robot 100 along the floor surface 10. The mobile robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Referring to FIG. 2B, the mobile robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 158 of the forward portions 122 connect the side surface 150, 152 to the forward surface 154.

In the example depicted in FIGS. 1 and 2A-2B, the mobile robot 100 is an autonomous mobile floor cleaning robot that includes a cleaning head assembly 116 (shown in FIG. 2A) operable to clean the floor surface 10. For example, the mobile robot 100 is a vacuum cleaning robot in which the cleaning head assembly 116 is operable to clean the floor surface 10 by ingesting debris 105 (shown in FIG. 1) from the floor surface 10. The cleaning head assembly 116 includes a cleaning inlet 117 through which debris is collected by the mobile robot 100. The cleaning inlet 117 is positioned forward of a center of the mobile robot 100, e.g., a center 162, and along the forward portion 122 of the mobile robot 100 between the side surfaces 150, 152 of the forward portion 122.

The cleaning head assembly 116 includes one or more rotatable members, e.g., rotatable members 118 driven by a roller motor 120. The rotatable members 118 extend horizontally across the forward portion 122 of the mobile robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the mobile robot 100. Referring also to FIG. 1, the cleaning inlet 117 is positioned between the rotatable members 118.

As shown in FIG. 1, the rotatable members 118 are rollers that counter rotate relative to one another. For example, the rotatable members 118 can include a front roller and a rear roller mounted parallel to the floor surface and spaced apart from one another by a small elongated gap. The rotatable members 118 can be rotatable about parallel horizontal axes 146, 148 (shown in FIG. 2A) to agitate debris 105 on the floor surface 10 and direct the debris 105 toward the cleaning inlet 117, into the cleaning inlet 117, and into a suction pathway 145 (shown in FIG. 1) in the mobile robot 100. Referring back to FIG. 2A, the rotatable members 118 can be positioned entirely within the forward portion 122 of the mobile robot 100. The rotatable members 118 include elastomeric shells that contact debris 105 on the floor surface 10 to direct debris 105 through the cleaning inlet 117 between the rotatable members 118 and into an interior of the mobile robot 100, e.g., into a debris bin 124 (shown in FIG. 1), as the rotatable members 118 rotate relative to the housing infrastructure 108. The rotatable members 118 further contact the floor surface 10 to agitate debris 105 on the floor surface 10. In the example as illustrated in FIG. 2A, the rotatable members 118, such as front and rear rollers, may each feature a pattern of chevron-shaped vanes distributed along its cylindrical exterior, and the vanes of at least one roller make contact with the floor surface along the length of the roller and experience a consistently applied friction force during rotation that is not present with brushes having pliable bristles.

The rotatable members 118 may take other suitable configurations. In an example, at least one of the front and rear rollers may include bristles and/or elongated pliable flaps for agitating the floor surface. In an example, a flapper brush, rotatably coupled to the cleaning head assembly housing, can include a compliant flap extending radially outward from the core to sweep a floor surface as the roller is driven to rotate. The flap is configured to prevent errant filaments from spooling tightly about the core to aid subsequent removal of the filaments. The flapper brush includes axial end guards mounted on the core adjacent the ends of the outer core surface and configured to prevent spooled filaments from traversing axially from the outer core surface onto the mounting features. The flapper brush can include multiple floor cleaning bristles extending radially outward from the core.

The mobile robot 100 further includes a vacuum system 119 operable to generate an airflow through the cleaning inlet 117 between the rotatable members 118 and into the debris bin 124. The vacuum system 119 includes an impeller and a motor to rotate the impeller to generate the airflow. The vacuum system 119 cooperates with the cleaning head assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The mobile robot 100 further includes a brush 126 (also referred to as a side brush) that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The mobile robot 100 includes a brush motor 128 operably connected to the side brush 126 to rotate the side brush 126.

The brush 126 is a side brush laterally offset from a fore-aft axis FA of the mobile robot 100 such that the brush 126 extends beyond an outer perimeter of the housing infrastructure 108 of the mobile robot 100. For example, the brush 126 can extend beyond one of the side surfaces 150, 152 of the mobile robot 100 and can thereby be capable of engaging debris on portions of the floor surface 10 that the rotatable members 118 typically cannot reach, e.g., portions of the floor surface 10 outside of a portion of the floor surface 10 directly underneath the mobile robot 100. The brush 126 is also forwardly offset from a lateral axis LA of the mobile robot 100 such that the brush 126 also extends beyond the forward surface 154 of the housing infrastructure 108. As depicted in FIG. 2A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning head assembly 116 as the mobile robot 100 moves. For example, in examples in which the mobile robot 100 is moving in the forward drive direction F, the brush 126 is rotatable in a clockwise direction (when viewed from a perspective above the mobile robot 100) such that debris that the brush 126 contacts moves toward the cleaning head assembly and toward a portion of the floor surface 10 in front of the cleaning head assembly 116 in the forward drive direction F. As a result, as the mobile robot 100 moves in the forward drive direction F, the cleaning inlet 117 of the mobile robot 100 can collect the debris swept by the brush 126. In examples in which the mobile robot 100 is moving in the rearward drive direction R, the brush 126 is rotatable in a counterclockwise direction (when viewed from a perspective above the mobile robot 100) such that debris that the brush 126 contacts moves toward a portion of the floor surface 10 behind the cleaning head assembly 116 in the rearward drive direction R. As a result, as the mobile robot 100 moves in the rearward drive direction R, the cleaning inlet 117 of the mobile robot 100 can collect the debris swept by the brush 126.

The electrical circuitry 106 includes, in addition to the controller circuit 109, a memory storage element 144 and a sensor system with one or more electrical sensors, for example. The sensor system, as described herein, can generate a signal indicative of a current location of the mobile robot 100, and can generate signals indicative of locations of the mobile robot 100 as the mobile robot 100 travels along the floor surface 10. The controller circuit 109 is configured to execute instructions to perform one or more operations as described herein. The memory storage element 144 is accessible by the controller circuit 109 and disposed within the housing infrastructure 108. The one or more electrical sensors are configured to detect features in an environment of the mobile robot 100. For example, referring to FIG. 2A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the mobile robot 100 where the cliff sensors 134 are disposed and redirect the robot accordingly. More details of the sensor system and the controller circuit 109 are discussed below, such as with reference to FIG. 3.

Referring to FIG. 2B, the sensor system includes one or more proximity sensors that can detect objects along the floor surface 10 that are near the mobile robot 100. For example, the sensor system can include proximity sensors 136a, 136b, 136c disposed proximate the forward surface 154 of the housing infrastructure 108. Each of the proximity sensors 136a, 136b, 136c includes an optical sensor facing outward from the forward surface 154 of the housing infrastructure 108 and that can detect the presence or the absence of an object in front of the optical sensor. For example, the detectable objects include obstacles such as furniture, walls, persons, and other objects, in the environment of the mobile robot 100. In some examples, the proximity sensors may detect flooring type and condition.

The sensor system includes a bumper system including the bumper 138 and one or more bump sensors that detect contact between the bumper 138 and obstacles in the environment. The bumper 138 forms part of the housing infrastructure 108. For example, the bumper 138 can form the side surfaces 150, 152 as well as the forward surface 154. The sensor system, for example, can include the bump sensors 139a, 139b. The bump sensors 139a, 139b can include break beam sensors, capacitive sensors, or other sensors that can detect contact between the mobile robot 100, e.g., the bumper 138, and objects in the environment. In some implementations, the bump sensor 139a can be used to detect movement of the bumper 138 along the fore-aft axis FA (shown in FIG. 2A) of the mobile robot 100, and the bump sensor 139b can be used to detect movement of the bumper 138 along the lateral axis LA (shown in FIG. 2A) of the mobile robot 100. The proximity sensors 136a, 136b, 136c can detect objects before the mobile robot 100 contacts the objects, and the bump sensors 139a, 139b can detect objects that contact the bumper 138, e.g., in response to the mobile robot 100 contacting the objects.

The sensor system includes one or more obstacle following sensors. For example, the mobile robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the mobile robot 100 and perpendicular to the side surface 150 of the mobile robot 100. For example, the detectable objects include obstacles such as furniture, walls, persons, and other objects in the environment of the mobile robot 100. In some implementations, the sensor system can include an obstacle following sensor along the side surface 152, and the obstacle following sensor can detect the presence or the absence an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described herein. In this regard, the left obstacle following can be used to determine a distance between an object, e.g., an obstacle surface, to the left of the mobile robot 100 and the mobile robot 100, and the right obstacle following sensor can be used to determine a distance between an object, e.g., an obstacle surface, to the right of the mobile robot 100 and the mobile robot 100.

In some implementations, at least some of the proximity sensors 136a, 136b, 136c, and the obstacle following sensor 141 each includes an optical emitter and an optical detector. The optical emitter emits an optical beam outward from the mobile robot 100, e.g., outward in a horizontal direction, and the optical detector detects a reflection of the optical beam that reflects off an object near the mobile robot 100. The mobile robot 100, e.g., using the controller circuit 109, can determine a time of flight of the optical beam and thereby determine a distance between the optical detector and the object, and hence a distance between the mobile robot 100 and the object.

In some implementations, the proximity sensor 136a includes an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the optical beams. In some implementations, the optical detector 180 is an imaging sensor, a camera, or some other type of detection device for sensing optical signals. In some implementations, the optical beams illuminate horizontal lines along a planar vertical surface forward of the mobile robot 100. In some implementations, the optical emitters 182, 184 each emit a fan of beams outward toward an obstacle surface such that a one-dimensional grid of dots appear on one or more obstacle surfaces. The one-dimensional grid of dots can be positioned on a horizontally extending line. In some implementations, the grid of dots can extend across multiple obstacle surfaces, e.g., multiple obstacle surfaces adjacent to one another. The optical detector 180 can capture an image representative of the grid of dots formed by the optical emitter 182 and the grid of dots formed by the optical emitter 184. Based on a size of a dot in the image, the mobile robot 100 can determine a distance of an object on which the dot appears relative to the optical detector 180, e.g., relative to the mobile robot 100. The mobile robot 100 can make this determination for each of the dots, thus allowing the mobile robot 100 to determine a shape of an object on which the dots appear. In addition, if multiple objects are ahead of the mobile robot 100, the mobile robot 100 can determine a shape of each of the objects. In some implementations, the objects can include one or more objects that are laterally offset from a portion of the floor surface 10 directly in front of the mobile robot 100.

The sensor system further includes an image capture device 140, e.g., a camera, directed toward a top portion 142 of the housing infrastructure 108. The image capture device 140 generates digital imagery of the environment of the mobile robot 100 as the mobile robot 100 moves about the floor surface 10. The image capture device 140 can be angled in a particular direction. In an example, the image capture device 140 is angled in an upward direction, e.g., angled between 30 degrees and 80 degrees from the floor surface 10 about which the mobile robot 100 navigates. The camera, when angled upward, is able to capture images of wall surfaces of the environment so that features corresponding to objects on the wall surfaces can be used for localization. In some examples, the image capture device 140 can be aimed in a forward direction (not being tilted).

When the controller circuit 109 causes the mobile robot 100 to perform the mission, the controller circuit 109 operates the motors 114 to drive the drive wheels 112 and propel the mobile robot 100 along the floor surface 10. In addition, the controller circuit 109 operates the roller motor 120 to cause the rotatable members 118 to rotate, operates the brush motor 128 to cause the side brush 126 to rotate, and operates the motor of the vacuum system 119 to generate the airflow. To cause the mobile robot 100 to perform various navigational and cleaning behaviors, the controller circuit 109 executes software stored on the memory storage element 144 to cause the mobile robot 100 to perform by operating the various motors of the mobile robot 100. The controller circuit 109 operates the various motors of the mobile robot 100 to cause the mobile robot 100 to perform the behaviors.

The sensor system can further include sensors for tracking a distance travelled by the mobile robot 100. For example, the sensor system can include encoders associated with the motors 114 for the drive wheels 112, and these encoders can track a distance that the mobile robot 100 has travelled. In some implementations, the sensor system includes an optical sensor facing downward toward a floor surface. The optical sensor can be an optical mouse sensor. For example, the optical sensor can be positioned to direct light through a bottom surface of the mobile robot 100 toward the floor surface 10. The optical sensor can detect reflections of the light and can detect a distance travelled by the mobile robot 100 based on changes in floor features as the mobile robot 100 travels along the floor surface 10.

The controller circuit 109 uses data collected by the sensors of the sensor system to control navigational behaviors of the mobile robot 100 during the mission. For example, the controller circuit 109 uses the sensor data collected by obstacle detection sensors of the mobile robot 100, e.g., the cliff sensors 134, the proximity sensors 136a, 136b, 136c, and the bump sensors 139a, 139b, to enable the mobile robot 100 to avoid obstacles or to prevent from falling down stairs within the environment of the mobile robot 100 during the mission. In some examples, the controller circuit 109 controls the navigational behavior of the mobile robot 100 using information about the environment, such as a map of the environment. With proper navigation, the mobile robot 100 is able to reach a goal position or completes a coverage mission as efficiently and as reliably as possible.

The sensor data can be used by the controller circuit 109 for simultaneous localization and mapping (SLAM) techniques in which the controller circuit 109 extracts features of the environment represented by the sensor data and constructs a map of the floor surface 10 of the environment. The sensor data collected by the image capture device 140 can be used for techniques such as vision-based SLAM (VSLAM) in which the controller circuit 109 extracts visual features corresponding to objects in the environment and constructs the map using these visual features. As the controller circuit 109 directs the mobile robot 100 about the floor surface 10 during the mission, the controller circuit 109 uses SLAM techniques to determine a location of the mobile robot 100 within the map by detecting features represented in collected sensor data and comparing the features to previously stored features. The map formed from the sensor data can indicate locations of traversable and nontraversable space within the environment. For example, locations of obstacles are indicated on the map as nontraversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the mobile robot 100 to perform its behaviors, the memory storage element 144 stores sensor data or data resulting from processing of the sensor data for access by the controller circuit 109 from one mission to another mission. For example, the map can be a persistent map that is usable and updateable by the controller circuit 109 of the mobile robot 100 from one mission to another mission to navigate the mobile robot 100 about the floor surface 10. According to various embodiments discussed in this document, the persistent map can be updated in response to instruction commands received from a user. The controller circuit 109 can modify subsequent or future navigational behaviors of the mobile robot 100 according to the updated persistent map, such as by modifying the planned path or updating obstacle avoidance strategy.

The persistent data, including the persistent map, enables the mobile robot 100 to efficiently clean the floor surface 10. For example, the persistent map enables the controller circuit 109 to direct the mobile robot 100 toward open floor space and to avoid nontraversable space. In addition, for subsequent missions, the controller circuit 109 is able to plan navigation of the mobile robot 100 through the environment using the persistent map to optimize paths taken during the missions.

The mobile robot 100 can, in some implementations, include a light indicator system 137 located on the top portion 142 of the mobile robot 100. The light indicator system 137 can include light sources positioned within a lid 147 covering the debris bin 124 (shown in FIG. 2A). The light sources can be positioned to direct light to a periphery of the lid 147. The light sources are positioned such that any portion of a continuous loop 143 on the top portion 142 of the mobile robot 100 can be illuminated. The continuous loop 143 is located on a recessed portion of the top portion 142 of the mobile robot 100 such that the light sources can illuminate a surface of the mobile robot 100 as they are activated.

Figure 3:
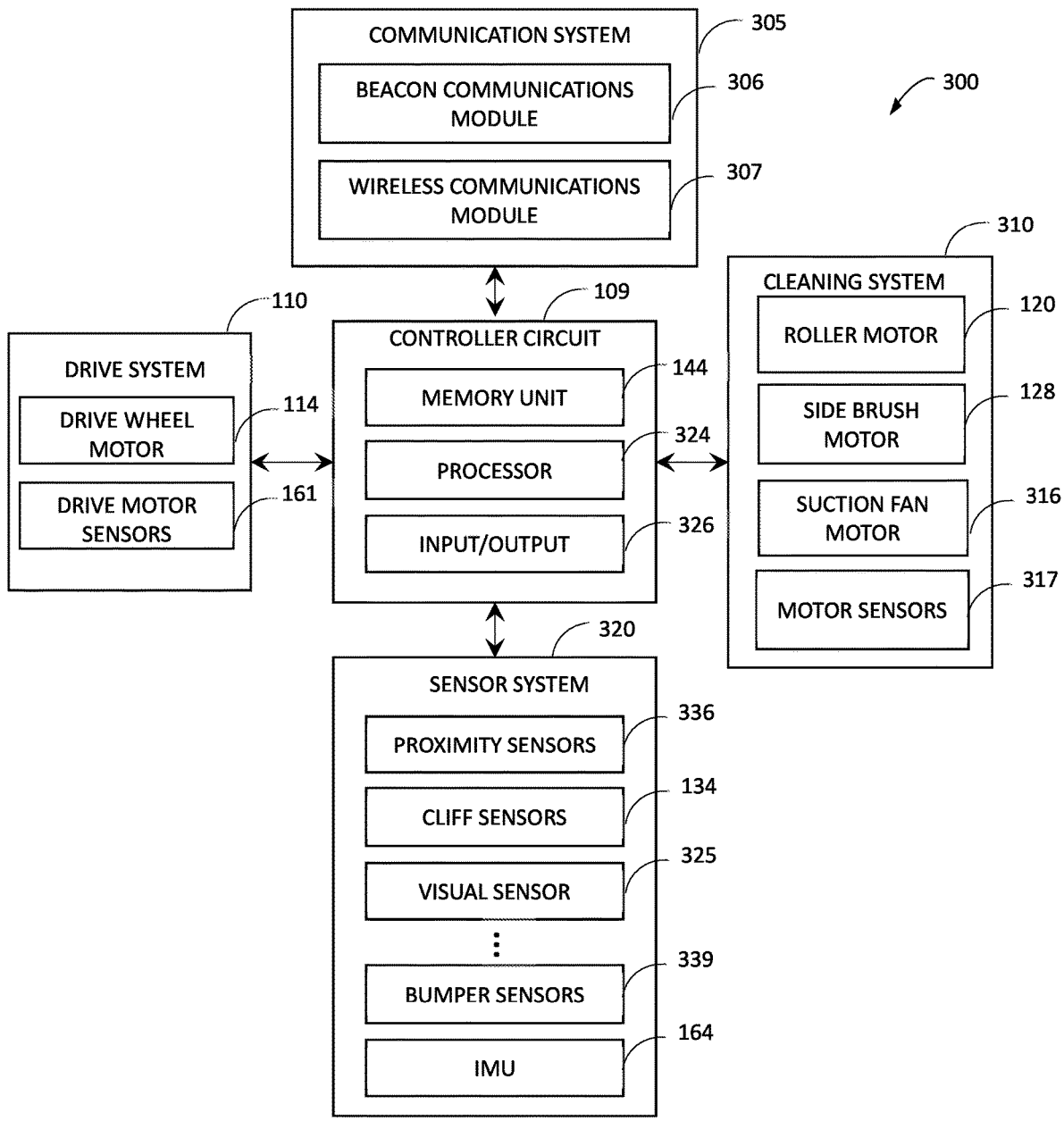
FIG. 3 is a diagram illustrating an example of a control architecture for operating a mobile cleaning robot.

FIG. 3 is a diagram illustrating an example of a control architecture 300 for operating a mobile cleaning robot. The controller circuit 109 can be communicatively coupled to various subsystems of the mobile robot 100, including a communications system 305, a cleaning system 310, a drive system 110, and a sensor system 320. The controller circuit 109 includes a memory storage element 144 that holds data and instructions for processing by a processor 324. The processor 324 receives program instructions and feedback data from the memory storage element 144, executes logical operations called for by the program instructions, and generates command signals for operating the respective subsystem components of the mobile robot 100. An input/output unit 326 transmits the command signals and receives feedback from the various illustrated components.

The communications system 305 can include a beacon communications module 306 and a wireless communications module 307. The beacon communications module 306 may be communicatively coupled to the controller circuit 109. In some embodiments, the beacon communications module 306 is operable to send and receive signals to and from a remote device. For example, the beacon communications module 306 may detect a navigation signal projected from an emitter of a navigation or virtual wall beacon or a homing signal projected from the emitter of a docking station. Docking, confinement, home base, and homing technologies are discussed in U.S. Pat. Nos. 7,196,487 and 7,404,000, U.S. Patent Application Publication No. 20050156562, and U.S. Patent Application Publication No. 20140100693 (the entireties of which are hereby incorporated by reference). As described in U.S. Patent Publication 2014/0207282 (the entirety of which is hereby incorporated by reference), the wireless communications module 307 facilitates the communication of information describing a status of the mobile robot 100 over a suitable wireless network (e.g., a wireless local area network) with one or more mobile devices (e.g., mobile device 404 shown in FIG. 4A). More details of the communications system 305 are discussed below, such as with reference to FIG. 4A.

The cleaning system 310 can include the roller motor 120, a brush motor 128 driving the side brush 126, and a suction fan motor 316 powering the vacuum system 119. The cleaning system 310 further includes multiple motor sensors 317 that monitor operation of the roller motor 120, the brush motor 128, and the suction fan motor 316 to facilitate closed-loop control of the motors by the controller circuit 109. In some embodiments, the roller motor 120 is operated by the controller circuit 109 (or a suitable microcontroller) to drive the rollers (e.g., rotatable members 118) according to a particular speed setting via a closed-loop pulse-width modulation (PWM) technique, where the feedback signal is received from a motor sensor 317 monitoring a signal indicative of the rotational speed of the roller motor 120. For example, such a motor sensor 317 may be provided in the form of a motor current sensor (e.g., a shunt resistor, a current-sensing transformer, and/or a Hall Effect current sensor).

The drive system 110 can include a drive-wheel motor 114 for operating the drive wheels 112 in response to drive commands or control signals from the controller circuit 109, as well as multiple drive motor sensors 161 to facilitate closed-loop control of the drive wheels (e.g., via a suitable PWM technique as described above). In some implementations, a microcontroller assigned to the drive system 110 is configured to decipher drive commands having x, y, and θ components. The controller circuit 109 may issue individual control signals to the drive-wheel motor 114. In any event, the controller circuit 109 can maneuver the mobile robot 100 in any direction across a cleaning surface by independently controlling the rotational speed and direction of each drive wheel 112 via the drive-wheel motor 114.

The controller circuit 109 can operate the drive system 110 in response to signals received from the sensor system 320. For example, the controller circuit 109 may operate the drive system 110 to redirect the mobile robot 100 to avoid obstacles encountered while treating a floor surface. In another example, if the mobile robot 100 becomes stuck or entangled during use, the controller circuit 109 may operate the drive system 110 according to one or more escape behaviors. To achieve reliable autonomous movement, the sensor system 320 may include several different types of sensors that can be used in combination with one another to allow the mobile robot 100 to make intelligent decisions about a particular environment. By way of example and not limitation, the sensor system 320 can include one or more of proximity sensors 336 (such as the proximity sensors 136a-136c), the cliff sensors 134, a visual sensor 325 such as the image capture device 140 configured for detecting features and landmarks in the operating environment and building a virtual map, such as using VSLAM technology, as described above.

The sensor system 320 may further include bumper sensors 339 (such as the bumper sensors 139a and 139b), responsive to activation of the bumper 138. The sensor system 320 can include an inertial measurement unit (IMU) 164 that is, in part, responsive to changes in position of the mobile robot 100 with respect to a vertical axis substantially perpendicular to the floor and senses when the mobile robot 100 is pitched at a floor type interface having a difference in height, which is potentially attributable to a flooring type change. In some examples, the IMU 164 is a six-axis IMU having a gyro sensor that measures the angular velocity of the mobile robot 100 relative to the vertical axis. However, other suitable configurations are also contemplated. For example, the IMU 164 may include an accelerometer sensitive to the linear acceleration of the mobile robot 100 along the vertical axis. In any event, output from the IMU 164 is received by the controller circuit 109 and processed to detect a discontinuity in the floor surface across which the mobile robot 100 is traveling. Within the context of the present disclosure the terms "flooring discontinuity" and "threshold" refer to any irregularity in the floor surface (e.g., a change in flooring type or change in elevation at a flooring interface) that is traversable by the mobile robot 100, but that causes a discrete vertical movement event (e.g., an upward or downward "bump"). The vertical movement event could refer to a part of the drive system (e.g., one of the drive wheels 112) or the chassis of the robot housing infrastructure 108, depending on the configuration and placement of the IMU 164. Detection of a flooring threshold, or flooring interface, may prompt the controller circuit 109 to expect a change in floor type. For example, the mobile robot 100 may experience a significant downward vertical bump as it moves from high pile carpet (a soft floor surface) to a tile floor (a hard floor surface), and an upward bump in the opposite case.

A wide variety of other types of sensors, though not shown or described in connection with the illustrated examples, may be incorporated in the sensor system 320 (or any other subsystem) without departing from the scope of the present disclosure. Such sensors may function as obstacle detection units, obstacle detection obstacle avoidance (ODOA) sensors, wheel drop sensors, obstacle-following sensors, stall-sensor units, drive-wheel encoder units, bumper sensors, and the like.

Examples of Communication Networks

FIG. 4A is a diagram illustrating by way of example and not limitation a communication network 400A that enables networking between the mobile robot 100 and one or more other devices, such as a mobile device 404, a cloud computing system 406, or another autonomous robot 408 separate from the mobile device 404. Using the communication network 400A, the mobile robot 100, the mobile device 404, the robot 408, and the cloud computing system 406 can communicate with one another to transmit data to one another and receive data from one another. In some implementations, the mobile robot 100, the robot 408, or both the mobile robot 100 and the robot 408 communicate with the mobile device 404 through the cloud computing system 406. Alternatively or additionally, the mobile robot 100, the robot 408, or both the mobile robot 100 and the robot 408 communicate directly with the mobile device 404. Various types and combinations of wireless networks (e.g., Bluetooth, radio frequency, optical based, etc.) and network architectures (e.g., mesh networks) may be employed by the communication network 400A.

In some implementations, the mobile device 404 as shown in FIG. 4A is a remote device that can be linked to the cloud computing system 406, and can enable a user to provide inputs on the mobile device 404. The mobile device 404 can include user input elements such as, for example, one or more of a touchscreen display, buttons, a microphone, a mouse, a keyboard, or other devices that respond to inputs provided by the user. The mobile device 404 alternatively or additionally includes immersive media (e.g., virtual reality) with which the user interacts to provide a user input. The mobile device 404, in these cases, is, for example, a virtual reality headset or a head-mounted display. The user can provide inputs corresponding to commands for the mobile device 404. In such cases, the mobile device 404 transmits a signal to the cloud computing system 406 to cause the cloud computing system 406 to transmit a command signal to the mobile robot 100. In some implementations, the mobile device 404 can present augmented reality images. In some implementations, the mobile device 404 is a smart phone, a laptop computer, a tablet computing device, or other mobile device.

According to various embodiments discussed herein, the mobile device 404 may include a user interface configured to display a map of the robot environment. Robot path, such as that identified by the coverage planner of the controller circuit 109, may also be displayed on the map. The interface may receive a user instruction to modify the environment map, such as by adding, removing, or otherwise modifying a keep-out traversable zone in the environment; adding, removing, or otherwise modifying a duplicate traversal zone in the environment (such as an area that requires repeated cleaning); restricting a robot traversal direction or traversal pattern in a portion of the environment; or adding or changing a cleaning rank, among others.

In some implementations, the communication network 400A can include additional nodes. For example, nodes of the communication network 400A can include additional robots. Alternatively or additionally, nodes of the communication network 400A can include network-connected devices. In some implementations, a network-connected device can generate information about the environment. The network-connected device can include one or more sensors to detect features in the environment, such as an acoustic sensor, an image capture system, or other sensor generating signals from which features can be extracted. Network-connected devices can include home cameras, smart sensors, smart locks, smart thermostats, smart garage door openers, and the like.

In the communication network 400A depicted in FIG. 4A and in other implementations of the communication network 400A, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Figure 4B:
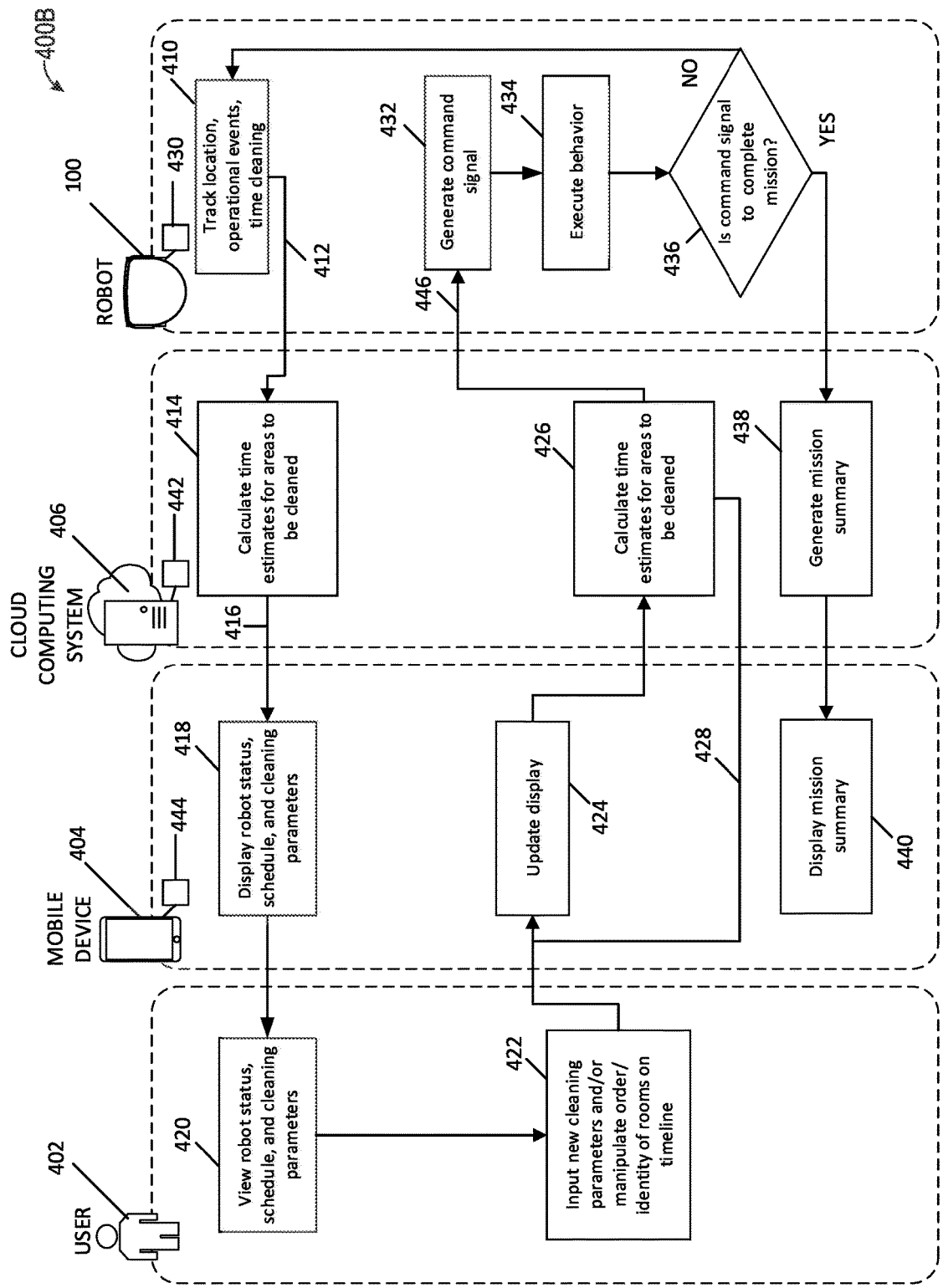
FIG. 4B is a diagram illustrating an exemplary process of exchanging information between the mobile robot and other devices in a communication network.

FIG. 4B is a diagram illustrating an exemplary process 400B of exchanging information among devices in the communication network 400A, including the mobile robot 100, the cloud computing system 406, and the mobile device 404. A cleaning mission may be initiated by pressing a button on the mobile robot 100 or may be scheduled for a future time or day. The user may select a set of rooms to be cleaned during the cleaning mission, select a set of areas or zones within a room, or may instruct the robot to clean all rooms. The user may also select a set of cleaning parameters to be used in each room during the cleaning mission.

During a cleaning mission, the mobile robot 100 tracks 410 its status, including its location, any operational events occurring during cleaning, and a time spent cleaning. The mobile robot 100 transmits 412 status data (e.g. one or more of location data, operational event data, time data) to a cloud computing system 406, which calculates 414, by a processor 442, time estimates for areas to be cleaned. For example, a time estimate could be calculated for a cleaning room by averaging the actual cleaning times for the room that have been gathered during multiple (e.g. two or more) prior cleaning missions for the room. The cloud computing system 406 transmits 416 time estimate data along with robot status data to a mobile device 404. The mobile device 404 presents 418, by a processor 444, the robot status data and time estimate data on a display. The robot status data and time estimate data may be presented on the display of the mobile device as any of a number of graphical representations editable mission timeline and/or a mapping interface. In some examples, the mobile robot 100 can communicate directly with the mobile device 404.

A user 402 views 420 the robot status data and time estimate data on the display and may input 422 new cleaning parameters or may manipulate the order or identity of rooms to be cleaned. The user 402, may, for example, delete rooms from a cleaning schedule of the mobile robot 100. In other instances, the user 402, may, for example, select an edge cleaning mode or a deep clean mode for a room to be cleaned. The display of the mobile device 404 is updated 424 as the user inputs changes to the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 402, the cloud computing system 406 calculates 426 time estimates for areas to be cleaned, which are then transmitted 428 (e.g. by a wireless transmission, by applying a protocol, by broadcasting a wireless transmission) back to the mobile device 404 and displayed. Additionally, data relating to the calculated 426 time estimates are transmitted 446 to a controller 430 of the robot. Based on the inputs from the user 402, which are received by the controller 430 of the mobile robot 100, the controller 430 generates 432 a command signal. The command signal commands the mobile robot 100 to execute 434 a behavior, which may be a cleaning behavior. As the cleaning behavior is executed, the controller continues to track 410 the robot's status, including its location, any operational events occurring during cleaning, and a time spent cleaning. In some instances, live updates relating to the robot's status may be additionally provided via push notifications to a mobile device or home electronic system (e.g. an interactive speaker system).

Upon executing 434 a behavior, the controller 430 checks 436 to see if the received command signal includes a command to complete the cleaning mission. If the command signal includes a command to complete the cleaning mission, the robot is commanded to return to the docking station and, upon return sends information to enable the cloud computing system 406 to generate 438 a mission summary which is transmitted to, and displayed 440 by, the mobile device 404. The mission summary may include a timeline and/or a map. The timeline may display, the rooms cleaned, a time spent cleaning each room, operational events tracked in each room, etc. The map may display the rooms cleaned, operational events tracked in each room, a type of cleaning (e.g. sweeping or mopping) performed in each room, etc.

Operations for the process 400B and other processes described herein can be executed in a distributed manner. For example, the cloud computing system 406, the mobile robot 100, and the mobile device 404 may execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

Examples of Docking Station and Dock Planning

Figure 5:
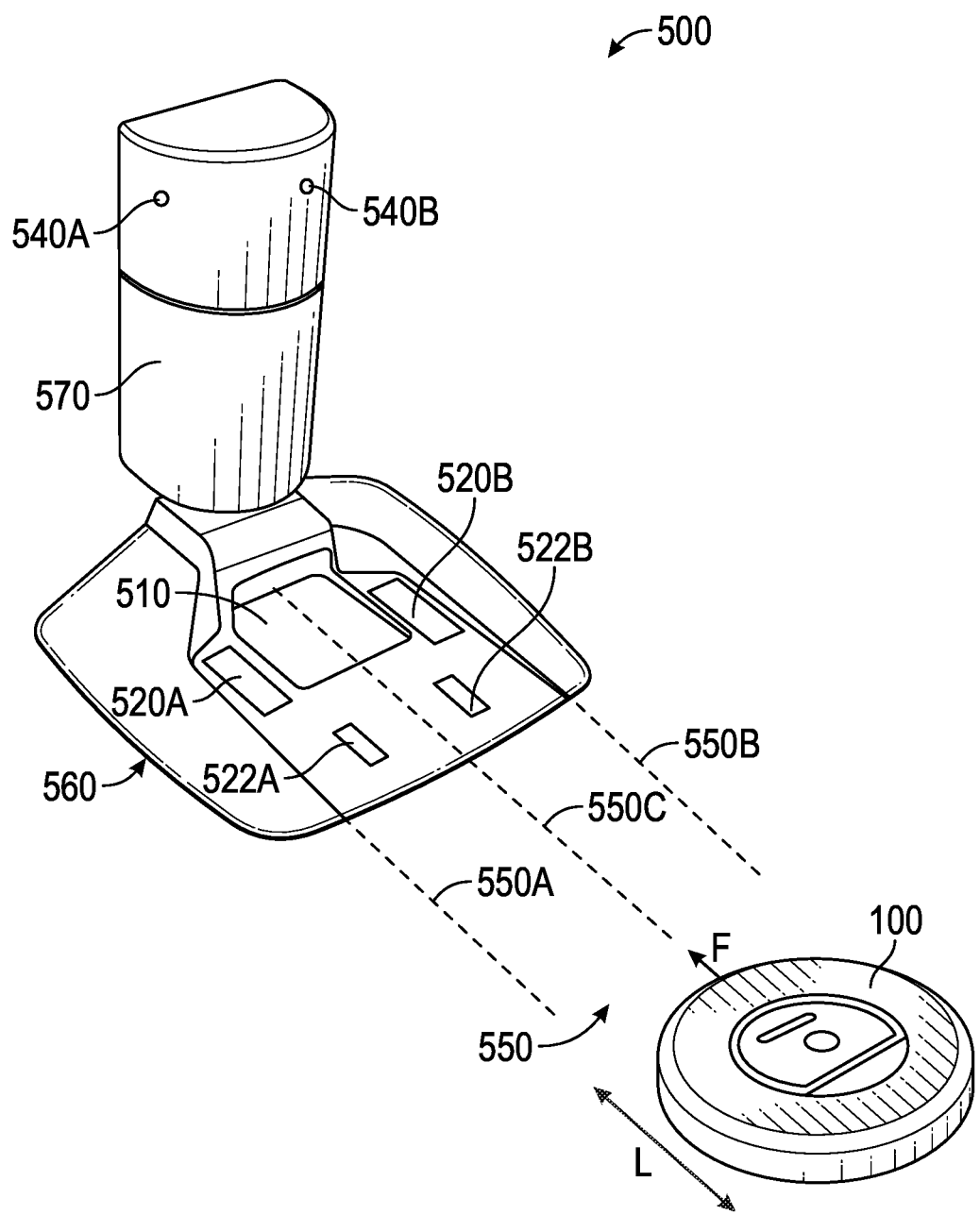
FIG. 5 is a diagram illustrating an example of a docking station for a mobile robot.

FIG. 5 illustrates an example of a docking station 500 (also referred to as a robot dock or a dock) for docking the mobile robot 100. The docking station 500 may include one or more distinct and distinguishable fiducial markers 540A and 540B. The docking station 500 may include or be connected to a power supply and include a docking port 560 having charging contacts 522A and 522B thereon that are operative to charge a battery of the mobile robot 100 when the robot 100 is docked at the docking station 500. In some examples, the docking station 500 may be an evacuation station and may include a receptacle 570 to extract debris collected by and stored in the robot 100. In some examples, the docking station 500 may be connected, wired or wirelessly, to a communication network, such as the cloud computing system 406, to enable or facilitate data transmission with the mobile robot 100 and/or the mobile device 404.

The fiducial markers 540A and 540B may be configured to define a pose (e.g., a position and/or orientation) of the docking station 500. The fiducial markers 540A and 540B may have a predetermined spatial relationship with respect to one another and/or to a reference on the docking station 500 and/or to a planar surface directly beneath the docking station 500. The mobile robot 100 may use its pose sensor assembly (e.g., a camera or an infra-red sensor) to detect the fiducial markers 540A and 540B, and determine a pose of the docking station 500. In some examples, the mobile robot 100 may map out a docking path from the current location of the mobile robot 100 to the docking station 500. The docking path may be used to provide instructions to the mobile robot 100 to maneuver the mobile robot 100 to the docking station 500, such that the mobile robot 100 may connect with locks, clamps or detents 520A and 520B, or with electrical contacts 522A and 522B of the docking port 560 to charge a battery.

In some examples, the docking path may be used to provide instructions that maneuver the robot 100 to align its air path with a docking lane or path such as an evacuation collar 510 on the docking station 500 such that the dock moves debris from the mobile robot 100 into the receptacle 570 of the docking station 500. The evacuation collar 510 (or mating collar) may be positioned such that the mobile robot 100 will be positioned above the evacuation collar 510. The fiducial markers 540A and 540B may be any feature that is configured to be used for pose detection. For example, the fiducial markers 540A and 540B may be a photogrammetry target, two or more lights such as LEDs, a spatially recognizable pattern, or a bar code.

When the time comes for recharging and/or evacuating debris, the mobile robot 100 may determine the location of the docking station 500 on a map created by the mobile robot 100 or stored therein, and navigate to the docking area about the docking station 500. From there, the mobile robot 100 may determine the pose of the mobile docking station 500 relative to the mobile robot 100, and plan a direct and unobstructed docking path to the docking station 500. As illustrated in FIG. 5, the mobile robot 100 may move in a forward direction along a docking lane 550 to the docking station 500. The docking lane 550 may be bounded by outside edges 550A and 550B, and has a central axis 550C aligned with the central axis of the docking port 560 into which the mobile robot 100 drives. By approaching the docking station 500 within the outside edges 550A and 550B, the mobile robot 100 may properly align its contacts with the docking contacts 522A and 522B, align its wheels with the dock detents 520A and 520B, and/or align the robot air path with the evacuation collar 510 of the docking station 500.

Examples of Dock Location Validation System

Discussed in the following with reference to FIGS. 6 and 7A-7C are various embodiments of systems, devices, and processes of systems, devices, and methods for automatically detecting one or more obstacles in a docking area around a docking station and validating a dock location for docking a mobile robot. While this document makes reference to the mobile robot 100 that performs floor cleaning, the docking validation system and methods discussed herein can be used in robots designed for different applications, such as mopping, mowing, transporting, surveillance, among others. Additionally, while some components, modules, and operations may be described as being implemented in and performed by the mobile robot 100, by a user, by a computing device, or by another actor, these operations may, in some implementations, be performed by actors other than those described. For example, an operation performed by the mobile robot 100 can be, in some implementations, performed by the cloud computing system 406 or by another computing device (or devices). In other examples, an operation performed by the user can be performed by a computing device. In some implementations, the cloud computing system 406 does not perform any operations. Rather, other computing devices perform the operations described as being performed by the cloud computing system 406, and these computing devices can be in direct (or indirect) communication with one another and the mobile robot 100. In some implementations, the mobile robot 100 can perform, in addition to the operations described as being performed by the mobile robot 100, the operations described as being performed by the cloud computing system 406 or the mobile device 404. Other variations are possible. Furthermore, while the methods and processes described herein are described as including certain operations or sub-operations, in other implementations, one or more of these operation or sub-operations may be omitted, or additional operations or sub-operations may be added.

Figure 6:
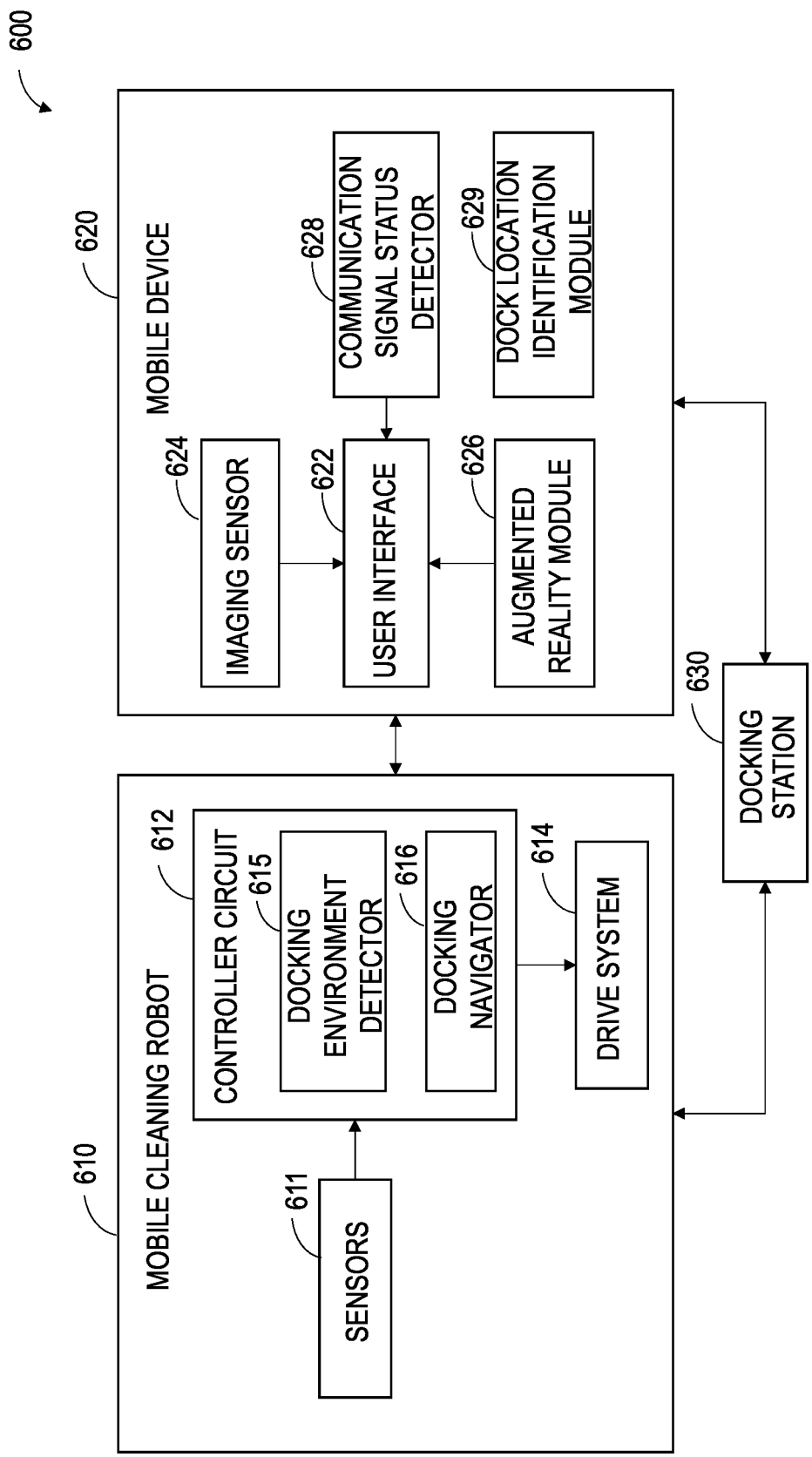
FIG. 6 is a block diagram illustrating an example of a mobile robot system for validating a dock location for docking a mobile robot.

FIG. 6 is a diagram illustrating an example of a mobile robot system 600 for validating a dock location for docking a mobile robot. The mobile robot system 600 comprises a mobile cleaning robot 610 and a docking station 630. In some examples, the mobile robot system 600 further includes a mobile device 620 operatively in communication with the mobile cleaning robot 610 and the docking station 630. In some examples, the mobile cleaning robot 610 may communicate with the mobile device 620 through the cloud computing system 406, as discussed above with reference to FIGS. 4A-4B.

The mobile cleaning robot 610, an embodiment of the mobile robot 100, may include, among other things, one or more sensors 611, a controller circuit 612, and a drive system 614. The controller circuit 612 may include a docking environment detector 615, and a docking navigator 616 to navigate the mobile cleaning robot 610 to the docking station 630 (an embodiment of the docking station 500). As illustrated in FIG. 6, the controller circuit 612 may be electrically coupled to one or more sensors 611, such as one or more sensors included in the sensor system 320 of the mobile robot 100 as discussed above with reference to FIGS. 2A-2B and 3. The docking environment detector 615 may detect, using the output of one or more sensors 611, a status of the docking area around the docking station 630, and validate the dock location for docking the mobile cleaning robot 610. In an example, the one or more sensors 611 may include an imaging sensor, a camera, or some other type of detection device. The imaging sensor or the camera can take an image of the docking area around the docking station 630, such as when the mobile cleaning robot 610 moves in the docking area and when the docking station 630 is within the field of view of the imaging sensor or the camera. In an example, the image of the docking area can be taken at the time of handoff between a far docking process and a near docking process. The far docking occurs when the mobile cleaning robot 610 navigates to the docking area based on, for example, a first portion of an image of the docking station. The subsequent near docking process occurs when the mobile cleaning robot 610 looks at a different second portion of the docking station image at a higher resolution to look for fiducials (e.g., the fiducial markers 540A and 540B in FIG. 5) on the docking station 630, and fine-tunes mobile robot's position and pose relative to the docking station 630 to ensure a successful docking. The docking environment detector 615 may detect, from the image of the docking area, a status of the docking area that obstructs or interferes with the docking behavior of the mobile cleaning robot, such as a presence or absence of one or more obstacles in the docking area.

Various image-based obstacle detection methods have been contemplated. In an example, the docking environment detector 615 may detect one or more obstacles in the docking area based on a comparison of the image of the docking area and a template image representing unobstructed docking area around the docking station. The template image may be pre-generated and stored in the mobile device 620, or in the cloud computing system 406 accessible by the mobile cleaning robot 610 and/or the mobile device 620. In some examples, the docking environment detector 615 may further determine the location of the one or more obstacles relative to the docking station or a known reference location based on the comparison between the docking area image and the template image.

In some examples, the docking environment detector 615 may additionally or alternatively detect one or more obstacles in the docking area using outputs from one or more sensors other than the imaging sensor or the camera, such as a bump sensor, an optical sensor, a proximity sensor, or an obstacle sensor, among others. For example, to detect the presence of absence of one or more obstacles in the docking area, the mobile cleaning robot 610 may traverse the docking area following a specific path with a specific area of coverage, such as instructed by the user via the mobile device 620 or in accordance with a pre-programmed docking detection routine. Output from the bumper sensor (such as bumper sensors 339 or 139A and 139B) may indicate whether the docking area is obstructed.

In alternative to images taken by the imagining sensor from the mobile cleaning robot 610, in some examples, the docking environment detector 615 may receive an image of the docking area from another device, such as the mobile device 620 or a camera installed on the environment with a field of view covering the docking area around the docking station 630. The mobile device 620, which is an embodiment of the mobile device 404, may be a smart phone, a personal digital assistant, a laptop computer, a tablet, a smart watch, or other portable computing device. As illustrated in FIG. 6, the mobile device 620 may include an imaging sensor 624, such as a camera mounted on the mobile device 620. A user may use the mobile device 620 to take an image of the docking area around the docking station, such as during the initial setup of the mobile cleaning robot 610 and the docking station 630, or after the docking station 630 has been moved to a new location in the environment. The docking environment detector 615 may detect a presence or absence of one or more obstacles in the docking area from the received image, such as based on a comparison of the image of the docking area and a template image representing unobstructed docking area, as discussed above.

The controller circuit 612 may generate a mission control signal to the drive system 614 (an embodiment of the drive system 110) to move the mobile cleaning robot 610 to the environment to conduct a cleaning mission. When the mobile cleaning robot 610 needs to recharge the battery and/or to evacuate the debris, the docking navigator 616 may navigate the mobile cleaning robot 610 to the docking station 630 if the status of the docking area satisfies a specific condition, such as the docking area or a portion thereof (e.g., the docking lane 550) is free of obstruction during the docking process. If the docking environment detector 615 determines that the docking area does not satisfy the specific condition, such as the docking area or a portion thereof (e.g., the docking lane 550) is obstructed by one or more obstacles, then an indicator of obstructed docking area may be provided to the mobile device 620, either directly from the mobile cleaning robot 610 or through the cloud computing system 406. The mobile device 620 may generate a notification to the user about the obstructed docking area, such as a message or other formats of alert via a user interface 622 of the mobile device 620. In some examples, a recommendation may be displayed on the user interface 622 to resolve the obstructed docking area, such as a recommendation to clear the docking area, or to reposition the docking station to a different location, before the mobile cleaning robot 610 enters the docking station 630. In some examples, additional information or help on robot docking may be provided to the user, such as in a form of frequently asked questions (FAQs) or a link to a knowledge base such as maintained in the cloud computing system 406.

In some examples, the status of the docking area detected by the docking environment detector 615 may additionally or alternatively be used to navigate the mobile cleaning robot 610 to leave the docking station for a cleaning mission. If the status of the docking area satisfies the specific condition (e.g., unobstructed docking area with sufficient spacing), then the docking navigator 616 may navigate the mobile cleaning robot 610 to leave the docking station 630. If the docking area does not satisfy the specific condition (e.g., obstructed docking area), then the user may be notified, optionally recommended to clear the docking area or to reposition the docking station to a different location, before the mobile cleaning robot 610 leaves the docking station 630.

The mobile device 620 may include a user interface 622 that allows a user to create or modify one or more cleaning missions or perform specific tasks, and to monitor the progress of the mission or tasks and operating status of the mobile cleaning robot 610. The user interface 622 may also present to the user the detected status of the docking area (e.g., whether it is obstructed or not) and a recommendation or a notification to resolve the obstruction in the docking area, as described above. The mobile device 620 may include an augmented reality (AR) module 626 configured to generate an AR representation of the docking area. The AR representation provides the user with an interactive experience of a real-world environment where an object of interest resides in the real world (e.g., the docking station, or the docking area therearound) are enhanced by machine-generated perceptual information, such as graphs, texts, or other visual or auditory information. In an example, the AR module 626 may generate a virtual bounding box overlaying upon the image of the docking area (e.g., generated by the imaging sensor of the mobile cleaning robot 610, or by the imaging sensor 624 of the mobile device 620). The machine-generated virtual bounding box defines a docking clearance zone around the docking station. Position and dimension of the bounding box (e.g., shape and/or boundaries of the bounding box relative to the docking station) may be provided by a user, such as via the user interface 622. The virtual bounding box may be displayed on the user interface 622 in different colors, render styles, or modes of presentation to visually distinguish a obstructed docking area from an unobstructed docking area. In alternative to directly displaying the bounding box (e.g., boundaries), in some examples, the AR module 626 may highlight or otherwise mark obstacles in the docking area that fall within the field of view of the camera of the mobile device 620 to distinguish the inside and the outside of the virtual bounding box without explicitly displaying the boundaries of the bounding box.

Figure 7A:
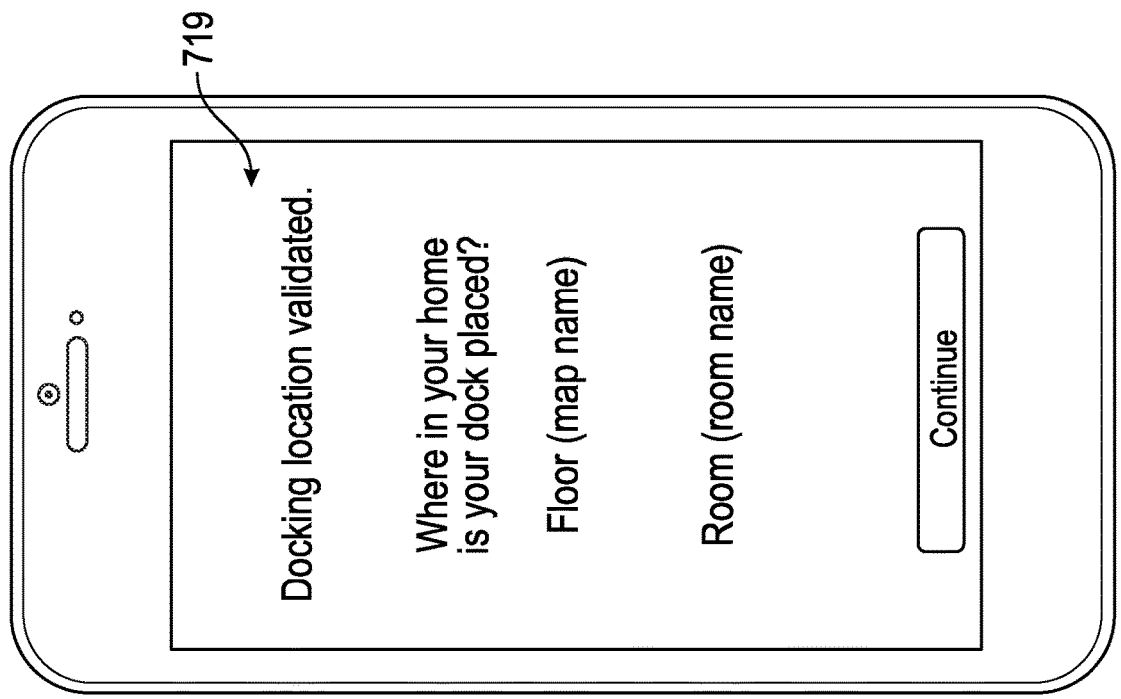
FIGS. 7A-7C illustrate examples of a user interface of a mobile device displaying an augmented reality (AR) representation of a docking area around a docking station.
Figure 7A:
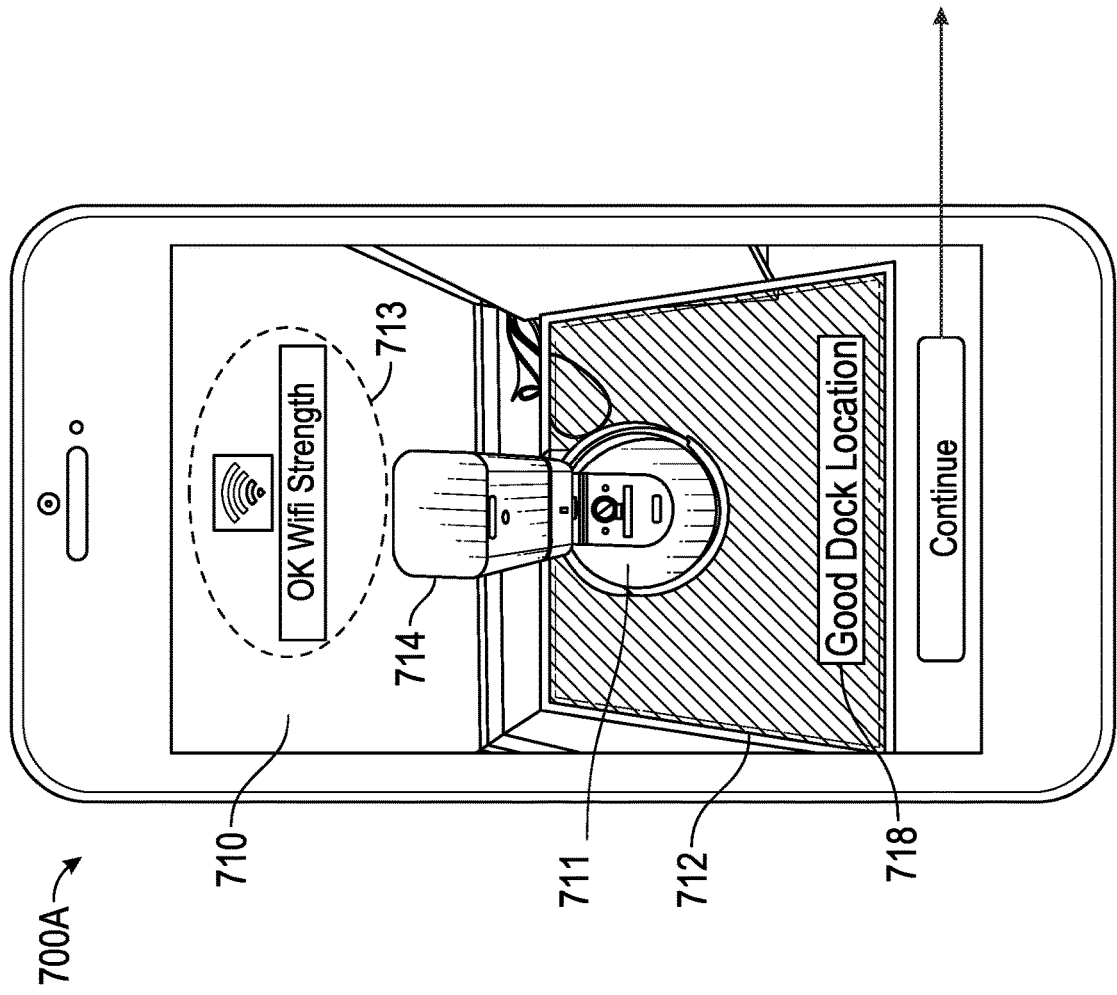

Referring now to FIG. 7A, a user interface of a mobile device (an example of the mobile device 620) displays an AR representation 700A of a docking area around a docking station for a mobile robot. The AR representation 700A includes an image of the docking area 710 around a docking station 714 (an example of the docking station 630). The image can be taken by a camera mounted on the mobile device. The docking station 714 may be used for recharging and/or evacuating a mobile cleaning robot 711. The AR representation 700A also includes a machine-generated virtual bounding box 712 (such as generated by the mobile device 620) overlaying upon the image of the docking area 710. The virtual bounding box 712 defines a docking clearance zone around the docking station 714. A user may provide information about location and dimensions of the bounding box 712 (e.g., shape and/or boundaries of the bounding box relative to the docking station) via the user interface 622. For example, a user may draw on the user interface a bounding box 712 with boundaries of approximately 0.5 meter to the left, 0.5 meter to the right, and one meter to the front, of the docking station 714 placed against a wall. In some examples, the position and dimensions of the bounding box 712 may be automatically determined, such as based on the size and shape of the mobile cleaning robot 711, the size and shape of the docking port 560, or docking route and pattern, among others. In some examples, the mobile device 620 may determine the position and dimensions of the bounding box 712 based on a graph representing docking failure rates, as to be discussed below with reference to FIG. 9A.

In this example, no obstacle is detected (e.g., by the docking environment detector 615) within the docking clearance zone inside the boundaries of the virtual bounding box 712. Accordingly, the virtual bounding box 712 is displayed in green color to indicate such a condition, optionally along with a push notification 718, "Good Dock Location", to indicate such a condition. The user may then command the mobile cleaning robot 711 to proceed to the docking station 714 by clicking on the "Continue" button. In an example, if the docking environment validation is performed at initial setup of the docking station 714 and the associated mobile cleaning robot, by clicking on the "Continue" button, a new screen 719 may be displayed. The user may be prompted to provide location information for the docking station 714, such as a floor name and a room/area name.

Figure 7B:
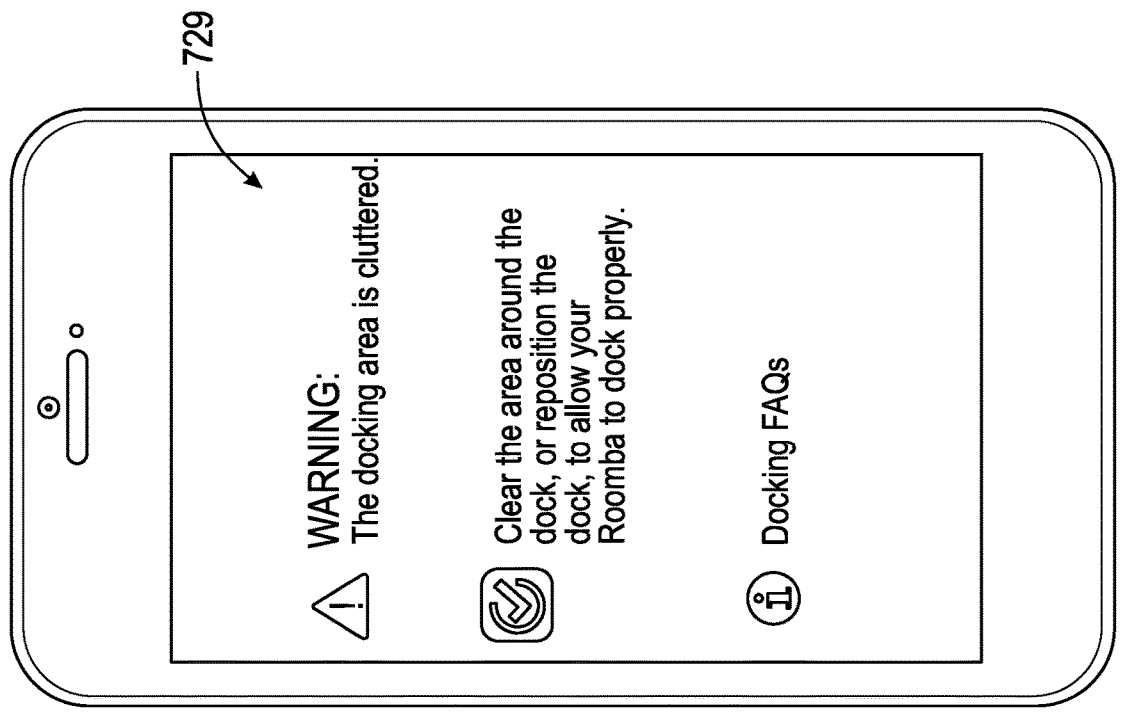
Figure 7B:
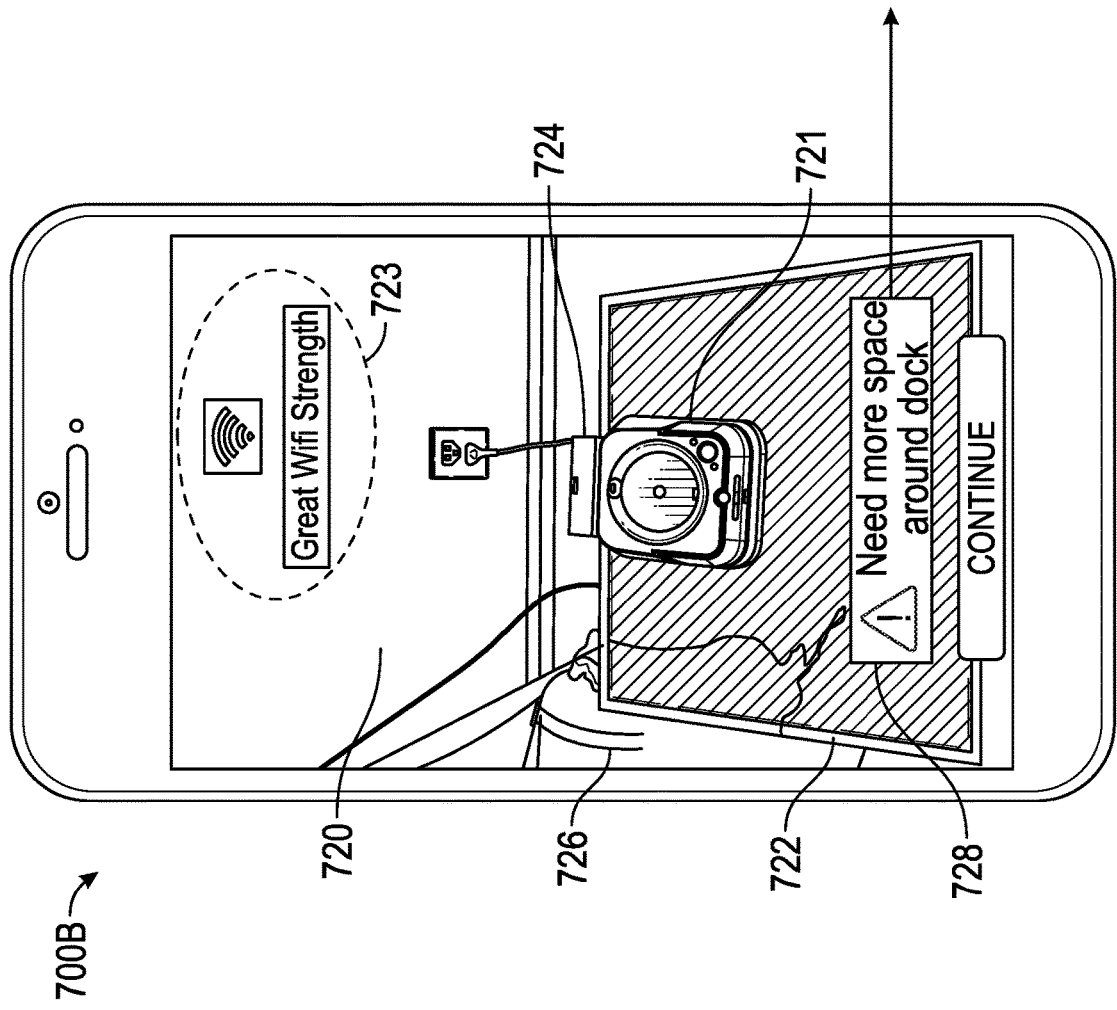

Referring to FIG. 7B, a user interface therein illustrates another example of an AR representation 700B, shown on a user interface of a mobile device, of a docking area 720 around a docking station 724. The docking station 724 is to charge a mobile robot 721, which can be a different type of mobile robot than the one in FIG. 7A. In this example, an object 726 is detected (e.g., by the docking environment detector 615), and as illustrated in FIG. 7B, a portion of the object 726 falls within the docking clearance zone defined by the virtual bounding box 722. Accordingly, the virtual bounding box 722 is displayed in red color to indicate that the docking area is obstructed. A warning message 728 "Need more space around dock" may be displayed to the user. In an example, when the user clicks on the warning message 728 (or other UI control buttons on the screen), additional information may be presented to user in a different screen 729, including a recommendations to clear the docking area, or to move the docking station to a different location. In an example, a link to FAQs or to a knowledge base (such as maintained in the cloud computing system 406) may be displayed to the user. The user may take one or more of the recommended actions, or bypass the recommendation, and command the mobile robot 721 to proceed to the docking station 724 by clicking on the "Continue" button.

Figure 8A:
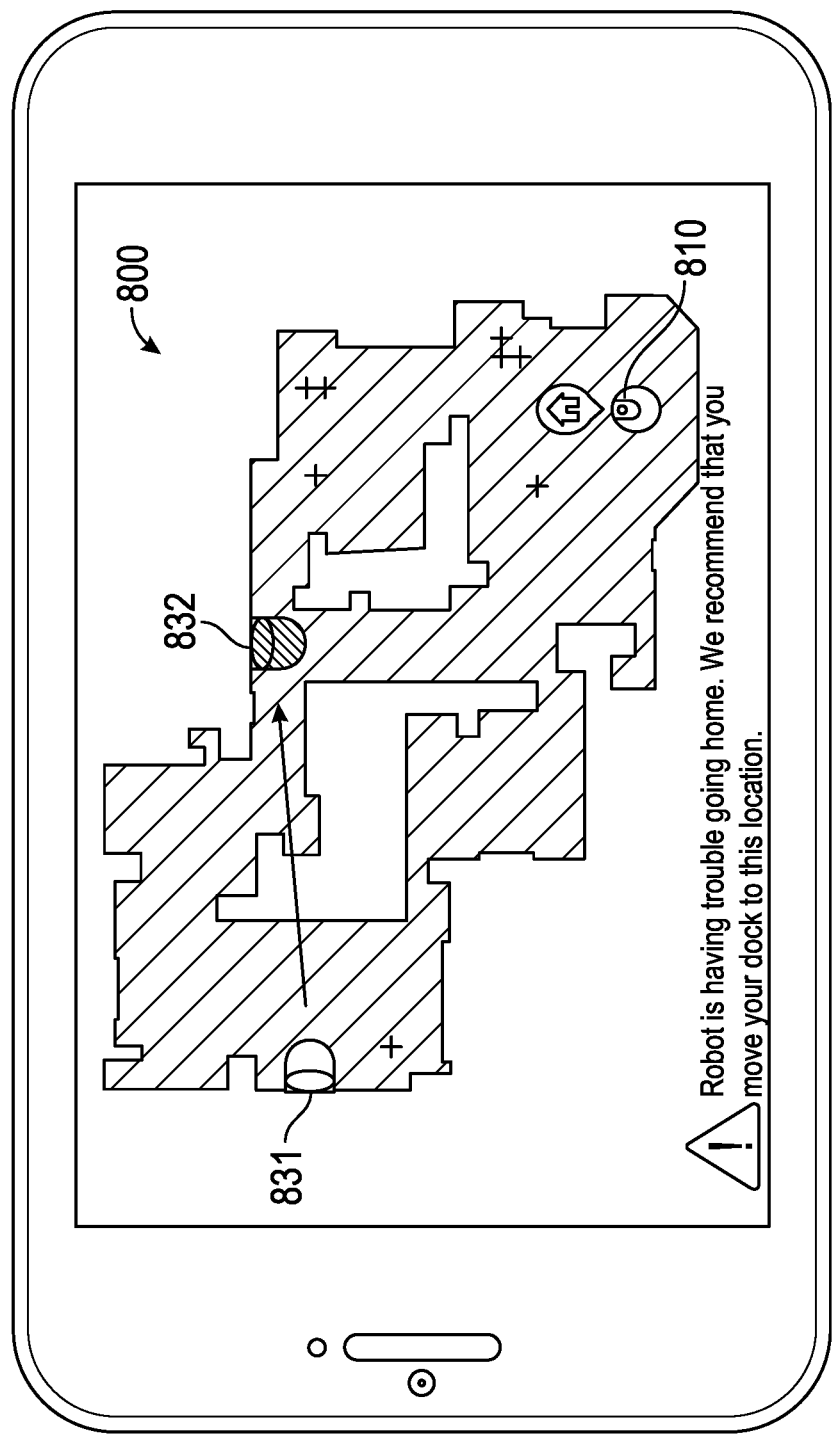
FIGS. 8A-8B illustrate examples of a user interface of a mobile device showing a present dock location and one or more suggested candidate dock locations on an environment map.
Figure 8B:
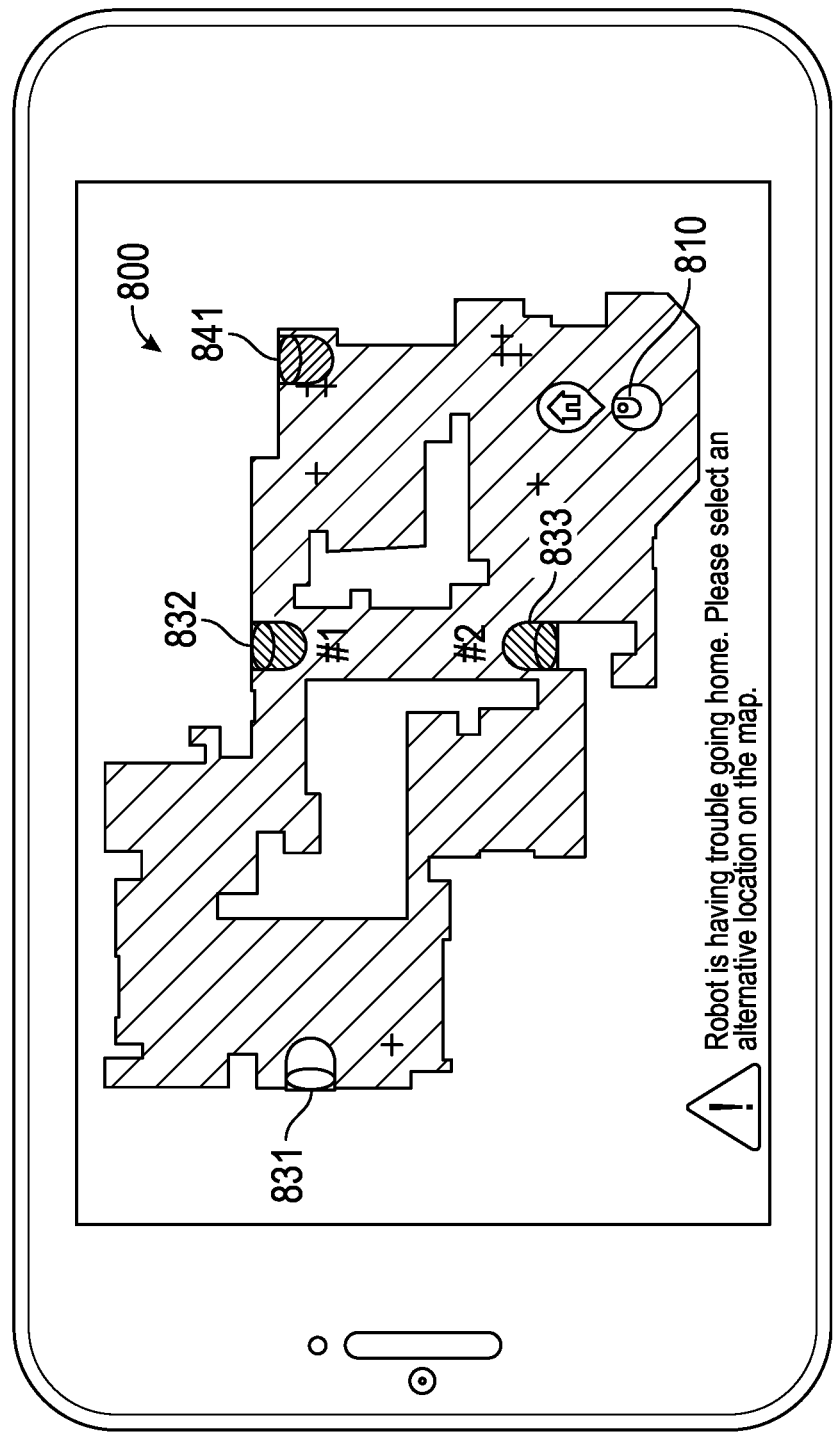

In some examples, a map of the environment, along with one or more suggested alternative locations for the docking station on the map, may be displayed on the user interface, such as in response to a user command. FIGS. 8A-8B illustrate examples of a user interface of a mobile device a current dock location and one or more suggested candidate dock locations on an environment map. Current mobile robot location 810 and current dock location 831 are shown on the map. If the current dock location 831 is determined to be unsuitable for docking (e.g., obstructed by an obstacle as illustrated in FIG. 7B), then the mobile device 620 may determine one or more alternative locations for the docking station, and display the one or more alternative locations on the map. FIG. 8A illustrates an candidate dock location 832, and a recommendation to reposition the docking station from its current location 831 to the candidate dock location 832. FIG. 8B illustrates two candidate dock locations 832 and 833. The user may select a location from the candidate dock locations, such as by clicking on the locations on map or using an UI control button on the user interface. In some examples, one or more dock locations of avoidance may also be displayed on the map, such as an avoidance location 841. The avoidance locations may be marked on the map (e.g., in red color) to alert the user to avoid placing the docking station in those locations.

Referring back to FIG. 6, the mobile device 620 may include a dock location identification module 629 configured to automatically identify one or more candidate dock locations in the environment, such as candidate dock locations 832 and 833. Identification of the candidate dock locations may be based on heuristics. For example, the candidate dock locations are to be within a specific range of the detected power outlets, near or against a wall, away from corners, away from doorways, away from high traffic areas, and/or away from carpet transitions. In some examples, the dock location identification module 629 may identify a candidate dock location as being in a central location of, or close to, commonly cleaned areas. Such location may help reduce average mission time particularly when the mobile robot needs to make multiple visits to the docking station during the mission to auto-evacuate or to recharge. In some examples, the dock location identification module 629 may identify a candidate location as being away from areas of high occupancy, such as a room or area where people visit frequently or stay longer. A low-occupancy area is generally preferred over a high-occupancy area for dock placement because it may help reduce disturbance, such as noise made during auto-evacuation. In an example, the dock location identification module 629 may identify a candidate location as being away from windows or other sources (e.g., light sources or infrared sources) that may interfere with the normal operation of the mobile robot's sensors.

Figure 9A:
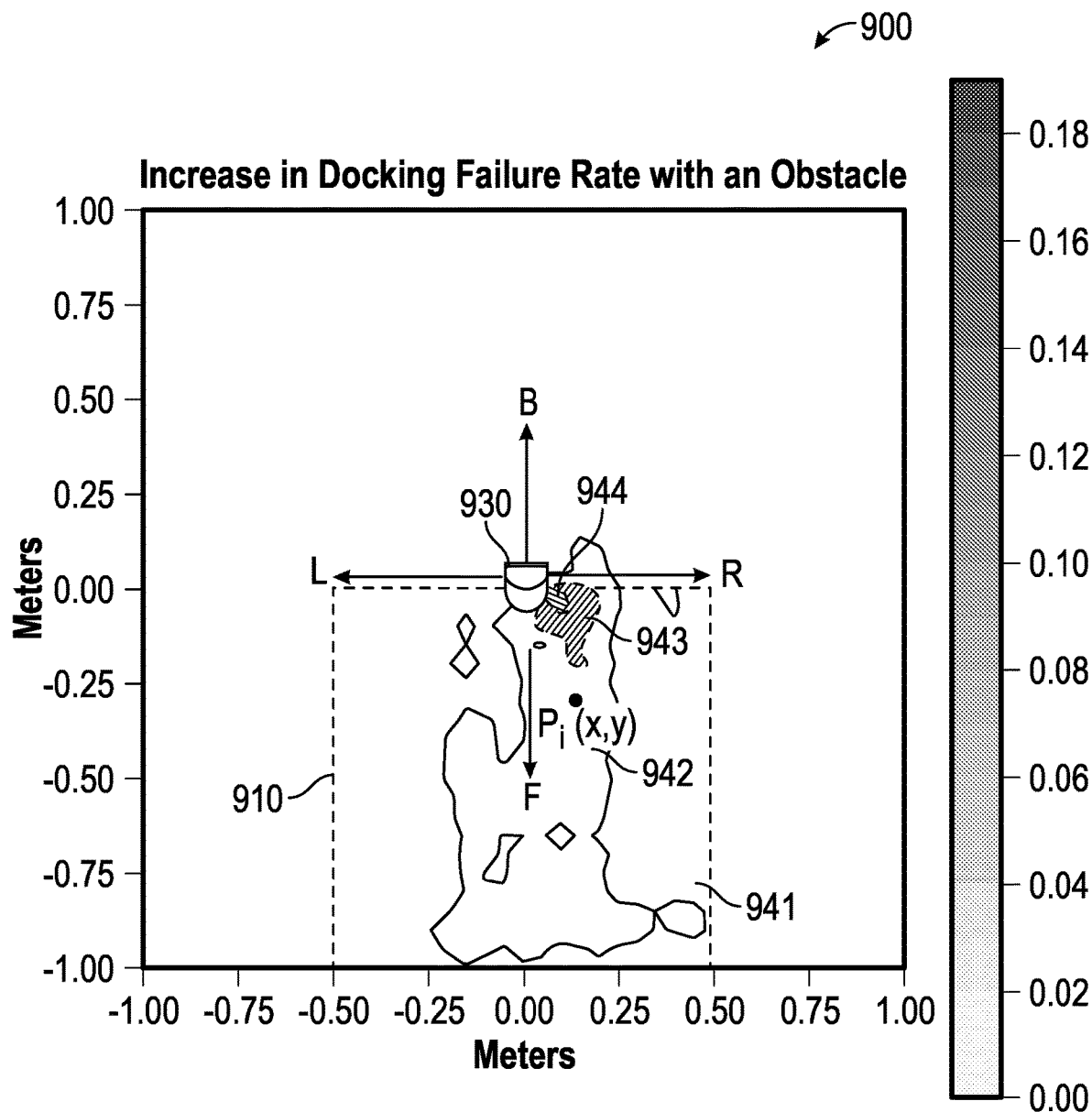
FIG. 9A illustrates an example of a user interface of a mobile device showing a heatmap of docking failure rates at various sites around a dock location on an environment map.

In some examples, the dock location identification module 629 may identify one or more candidate dock locations based on the mobile robot's docking performance around one or more of the candidate locations. In an example, the dock location identification module 629 may generate a graph representing docking failure rates (DFR) at various sites $\{P_1, P_2, \ldots, P_n\}$ around the dock location. The DFR at a particular site (e.g., $P_i(x,y)$) indicates how likely a mobile robot would fail to dock properly to the docking station if the site $P_i$ is occupied by an obstacle. The graph may be created by aggregating DFR values respectively determined for various sites $\{P_1, P_2, \ldots, P_n\}$. In an example, the DFR values may be clustered and shown in a graph. In another example, the graph may be represented in a form of heatmap. Referring to FIG. 9A, a heatmap 900 of a dock location may be generated by aligning multiple maps across many mobile robots (or multiple docking instances by the same mobile robot) in a coordinate system, such that the docking station 930 is located at the origin (0,0) of the coordinate system. For a site $P_i$ in a docking area around the dock location, a first docking failure rate $DFR_i(1)$ may be computed when site $P_i$ is occupied by an obstacle. A second docking failure rate $DFR_i(2)$ may be computed when there is no obstacle at site $P_i$. A change in DFR at site $P_i$ may be computed by subtracting $DFR_i(2)$ from $DFR_i(1)$, that is, $\Delta DFR_i = DFR_i(1) - DFR_i(2)$. $\Delta DFR_i$ represents an impact of an obstacle at site $P_i$ on the mobile robot's docking performance. In the example as illustrated in FIG. 9A, the heatmap 900 is a two-dimensional map of $\Delta DFR$ values at multiple sites $\{P_1, P_2, \ldots, P_n\}$, where the $\Delta DFR$ values are represented by variation in color either by hue or intensity. A positive $\Delta DFR_i$ value indicates an increase in docking failure rate when $P_i$ is occupied by an obstacle. A site $P_i$ that is associated with a larger positive $\Delta DFR_i$ value is a more critical site than a different site $P_j$ with a smaller $\Delta DFR_j$ value in determining the mobile robot's docking performance.

Different subareas around the docking station with distinct $\Delta DFR$ values or value ranges may be identified. For example, those sites in subarea 941 have $\Delta DFR$ values substantially equal to zero, indicating that obstacle presented in those sites have no or minimal impact on the mobile robot's docking performance. Sites in subarea 942 have lower $\Delta DFR$ values than sites in subarea 943, which have lower $\Delta DFR$ values than sites in subarea 944. FIG. 9A illustrates an example of a bounding box 910 defined by boundaries of approximately 0.5 meter to the left (L), 0.5 meter to the right (R), and one meter to the front (F), of the docking station 930. The bounding box 910 covers most of the sites associated with a positive $\Delta DFR$ value (i.e., increased docking failure rates) if any of the sites are occupied by an obstacle. A user may define the bounding box for detecting one or more obstacles around the docking station, such as the bounding box 712 or 722 as shown in FIGS. 7A-7B, based on the heatmap 900.

In some examples, the heatmap 900 may be used to distinguish obstacles that are more problematic for docking from those less problematic obstacles. For example, an obstacle detected in subarea 944 may more likely cause docking failure than an obstacle detected in the subarea 943, which may more likely cause docking failure than an obstacle detected in the subarea 942. Based on the identified subareas (e.g., subareas 941-944) and their coordinate locations on the heatmap 900, a recommendation to clear the docking area may be presented to the user. For example, if a couch or a portion thereof is detected in the subarea 943, a recommendation may be generated to the user, e.g., moving the couch ten inches to the left of the docking station. In some examples, different levels of alert may be generated to the user based on the location of the detected obstacle. For example, a higher-level alert may be generated if an obstacle is detected in a high DFR subarea (e.g., subarea 944) than in a low DFR subarea (e.g., subareas 942 or 941). A user may use the heatmap 900 shown on the user interface as a guide to clear the obstructed docking area, such as by moving an obstacle detected in high DFR subarea (e.g., subarea 944) to a low DFR subarea (e.g., subareas 942 or 941).

The dock location identification module 629 may detect if a present dock location is suitable for docking using a heatmap of the present dock location. In an example, the dock location identification module 629 may compute a docking failure score $S_{DF}$ using a comparison of the area around the present dock location to the heatmap. The docking failure score $S_{DF}$ may be accumulated across multiple sites and subareas of the docking area. A high DFR subarea (e.g., subarea 944) contributes more to the accumulated $S_{DF}$ than a low DFR subarea (e.g., subarea 942). The accumulated $S_{DF}$ can be compared to a threshold. If $S_{DF}$ falls below the threshold, the present dock location is deemed appropriate for docking. If $S_{DF}$ exceeds the threshold, the present dock location is deemed unsuitable for docking; and a recommendation may be presented to the user to move the docking station to an alternative location, such as one of the candidate dock locations 832 or 833 as illustrated in FIG. 8B.

Figure 9B:
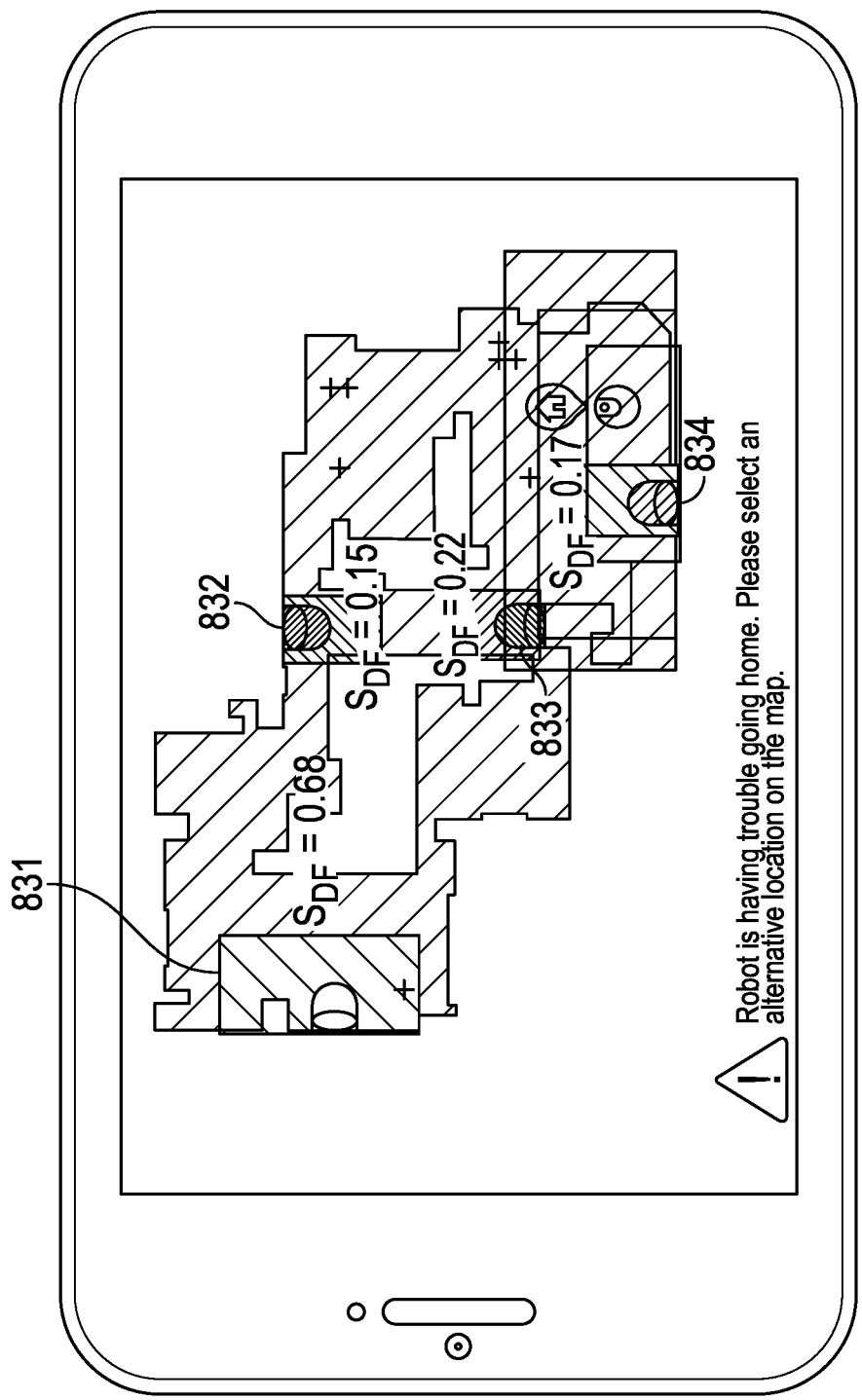
FIG. 9B illustrates an example of a user interface of a mobile device showing heatmaps of docking failure rates around various dock locations on an environment map.

The dock location identification module 629 may suggest one or more candidate dock locations based on respective heatmaps of the one or more candidate dock locations. In an example, heatmaps may be generated respectively for locations along one or more walls in the map of the environment, such as N candidate dock locations $\{D_1, D_2, \ldots, D_N\}$ along the wall. Docking failure scores $\{S_{DF}(1), S_{DF}(2), \ldots, S_{DF}(N)\}$, as discussed above, may be computed from the respective heatmaps generated around each of the N candidate dock locations $\{D_1, D_2, \ldots, D_N\}$. As $S_{DF}$ represents an accumulative docking failure rates, a candidate dock location $D_i$ with a higher $S_{DF}$ value is more prone to docking failure that a candidate location $D_j$ with a lower $S_{DF}$ value. The dock location identification module 629 may select from $\{D_1, D_2, \ldots, D_N\}$ a location corresponding the lowest $S_{DF}$, and present it to the user as a recommended dock location. In some examples, the dock location identification module 629 may rank the N candidate locations (or a portion thereof) in a descending order or an ascending order of $S_{DF}$ values, present the ranked candidate locations to the user, and prompt the user to select a location therefrom. Referring to FIG. 9B, a user interface of a mobile device shows heatmaps of docking failure rates for a number of candidate dock locations 832, 833, and 834 on an environment map 800. A heatmap of docking failure rates for the current dock location 831 is also shown. Additionally or alternatively, docking failure scores ($S_{DF}$) for the current dock location 831 and the candidate dock locations 832, 833, and 834 may be shown on the map next to respective candidate dock locations. In this illustrative example, the current dock location 831 has a $S_{DF}$ score of 0.68, higher than the $S_{DF}$ values of any of the candidate dock locations 832, 833, and 834. A user may select a candidate location for dock placement, such as candidate dock location 832 which has the smallest $S_{DF}$ value, by clicking on that site on the map or using a UI control button on the user interface.

Referring back to FIG. 6, the mobile device 620 may include a communication signal status detector 628 configured to detect a wireless communication signal status in an area of the environment. The wireless communication signal transmits data between the mobile cleaning robot 610 and one or more of the docking station 630 or the mobile device 620. The wireless communication signal may be generated by a local electronic device and received by a wireless receiver of the mobile cleaning robot 610. By way of non-limiting example, the wireless communication signal status includes a Wi-Fi signal strength. In an example, a user may position the mobile device 620 in the docking area to detect the wireless communication signal status therein, such as during the initial setup of the mobile cleaning robot 610 and the docking station 630, or after the docking station 630 has been moved to a new location in the environment. The detected wireless communication signal status (e.g., Wi-Fi signal strength) at the docking area may be presented to the user, such as displayed on the user interface 622. Referring to FIG. 7A, wireless communication signal status, such as an indicator of Wi-Fi signal strength, may be displayed on the user interface as a part of the AR representation of the docking area. In this example, the Wi-Fi signal strength is moderate. A Wi-Fi signal strength indicator may be overlaid upon the image of the docking area. A push notification 713 "OK Wi-Fi Strength" may be displayed to the user. Similarly, FIG. 7B illustrates an example when a strong Wi-Fi signal is detected such as by the mobile device in the docking area. A corresponding Wi-Fi signal strength indicator and a push notification 723 "Good Wi-Fi Strength" can be displayed, along with other information included in the AR representation 700B as discussed above.

If a weak wireless communication signal (e.g., a weak Wi-Fi signal strength) is detected at the docking area, then the mobile device 620 may generate a notification to the user about the weak wireless communication signal in a format of message or alerts. In an example, a recommendation may be displayed on the user interface 622, such as a recommendation to move the docking station to a different location with better wireless communication signal coverage. In some examples, additional information or help on robot docking may be provided to the user, such as in a form of frequently asked questions (FAQs) or a link to a knowledge base such as maintained in the cloud computing system 406. Referring to FIG. 7C, a user interface therein illustrates an example of an AR representation 700C similar to the AR representation 700A, except that in this example, a weak Wi-Fi signal is detected at the docking area. A corresponding Wi-Fi signal strength indicator and a push notification 733 "Poor Wi-Fi Strength" can be displayed, along with other information included in the AR representation 700C. Recommendations to improve the Wi-Fi signal strength (e.g., moving the docking station to a different location) and optionally a link to FAQs or a knowledge base maintained in the cloud computing system 406, may be presented to the user. The user may take one or more of the recommended actions, or bypass the recommendation, and command the mobile cleaning robot 711 to proceed to the docking station 714 by clicking on the "Continue" button.

A user may provide information about the docking station 630, such as a location of the docking station 630 in the environment, via the user interface 622. In an example, the user interface 622 may display a map of the environment, and the user may identify the location of the docking station 630 on the map. During the initial setup of the mobile cleaning robot 610 and the docking station 630, once the dock location is detected to satisfy a specific condition (e.g., free of obstacles in the docking area, and/or having a satisfactory Wi-Fi coverage), the mobile device 620 may prompt the user to provide, via the user interface 622, location information of the docking station 630, such as a floor name and a room/area name. Alternatively, the user may draw, mark, or label the dock location using UI controls on the user interface 622. Labelling the dock location on the map may help with user comprehension of the docking station and the docking process. An example of the providing dock location information via the user interface is illustrated in FIG. 7A.

Referring back to FIG. 6, the mobile device 620 may receive information about operating status of the mobile cleaning robot 610 and/or operating status of the docking station 630 directly from respective devices or from the cloud computing system 406, and display such information on the user interface 622. The received operating status information, or a portion thereof, may be included in the AR representation of the docking area. In an example, a user may hold and point the mobile device 620 at the mobile cleaning robot 610 to take an image of the docking area around the docking station 630. The mobile device 620 may include an image processor to recognize the docking station 630 from the image of the docking area, and receive information about operating status of the docking station 630 such as stored in the cloud computing system 406. The operating status of the docking station 630 may include, by way of example and not limitation, status of the evacuation bag inside the docking station 630 (e.g., fullness of the evacuation bag), or estimated time of replacement of parts such as the evacuation bag, among others. In an example where multiple different mobile robots (e.g., a cleaning robot and a mopping robot) associated with their respective docking stations are present in the environment (e.g., the user's home), the mobile device 620 may take images of respective docking stations, and receive respective operating status of the mobile robots as recognized from the images.

In an example, a user may hold and point the mobile device 620 at the mobile cleaning robot 610 to take an image of the mobile cleaning robot 610. The mobile device 620 may recognize the mobile cleaning robot 610 from the image, and receive information about operating status of the mobile cleaning robot 610 such as stored in the cloud computing system 406. The information about the mobile cleaning robot's operating status may include, by way of example and not limitation, status of the debris bin of the mobile cleaning robot 610 (e.g., fullness of the debris bin for collecting and temporarily storing debris collected by the mobile cleaning robot 610), status of a filter to filter the debris (e.g., wear and tear of the filter or need of replacement), status of one or more sensors, or status of the battery, among others. In an example where multiple different mobile robots (e.g., a cleaning robot and a mopping robot) are present in the environment, the mobile device 620 may take images of one or more mobile robots, and receive respective operating status of the docking stations as recognized from the images. An AR representation of the mobile cleaning robot comprising a notification of the operating status of the mobile cleaning robot overlaying upon the image of the mobile cleaning robot, may be generated and displayed on the user interface 622.

Figure 7D:
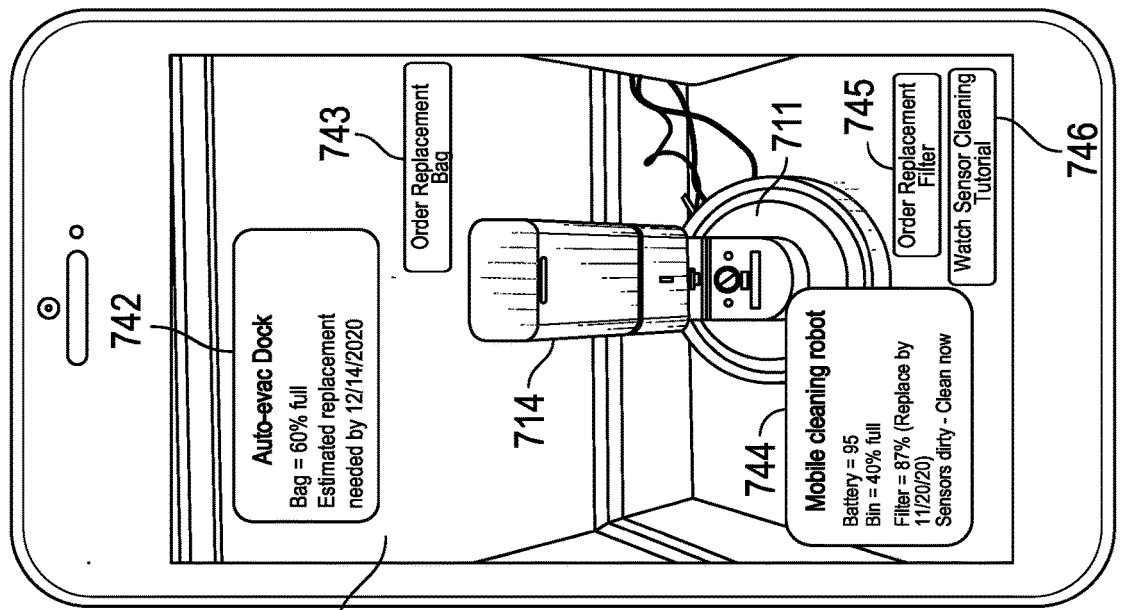
FIG. 7D illustrates an example of a user interface of a mobile device displaying an AR representation of a docking area along with information about operating status of the docking station and the mobile robot.
Figure 7C:
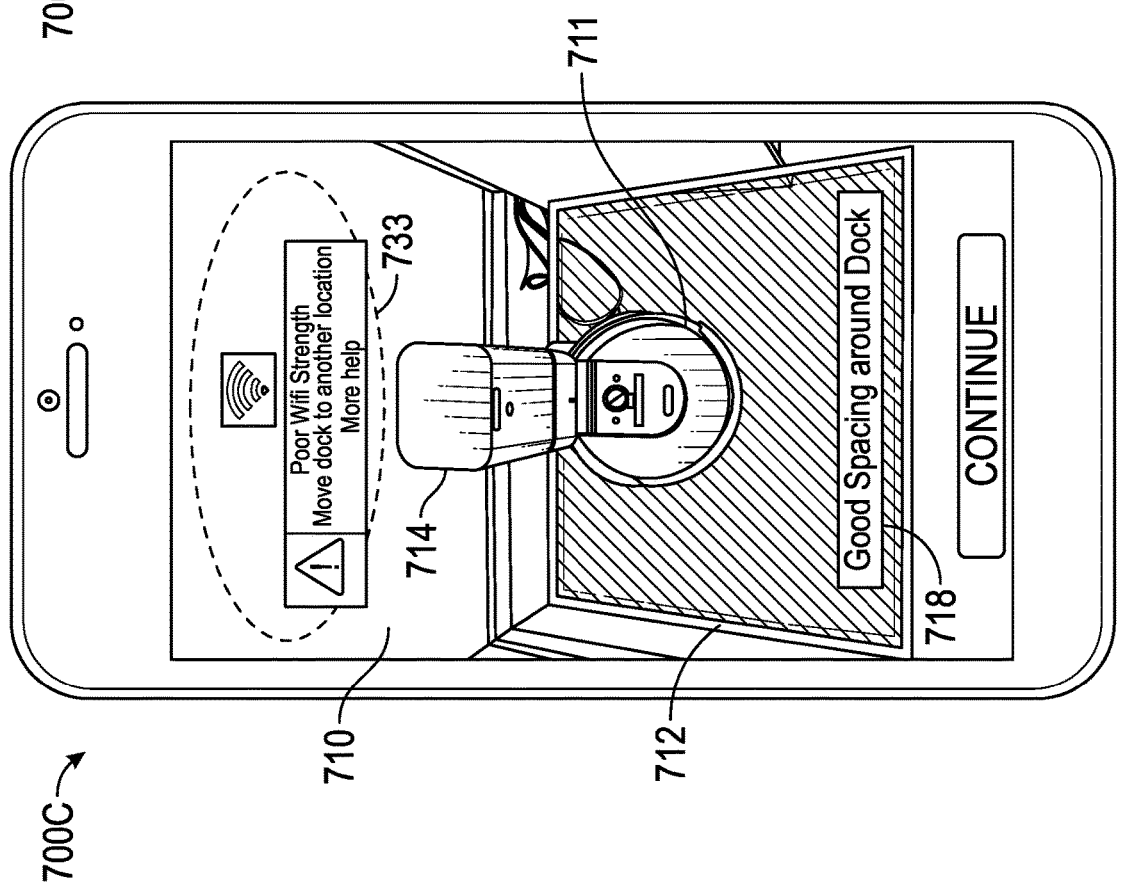

Referring to FIG. 7D, a user interface therein illustrates an example of an AR representation 700D of a docking area 740 around a docking station 714 for docking a mobile cleaning robot 711. The AR representation 700D includes information 742 about the docking station 714 (e.g., product identification and serial number) and its operating status, such as fullness of the evacuation bag and estimated time of replacement. A product/part order link 743 to place an order of parts (e.g., a new evacuation bag) may also be displayed on the AR representation 700D. The AR representation 700D may also include information 744 about the mobile cleaning robot 711 (e.g., product identification and serial number), and its operating status, such as battery status, fullness of the debris bin, filter status, estimated time of part replacement (e.g., filters), sensor status (e.g., dirtiness and need for cleaning/maintenance), etc. A product/part order link 745 to place an order of parts (e.g., a new filter), or a tutorial link 746 for device/part maintenance among other educational information, may also be displayed on the AR representation 700D.

Examples of Methods of Validating a Dock Location for a Mobile Robot

Figure 10:
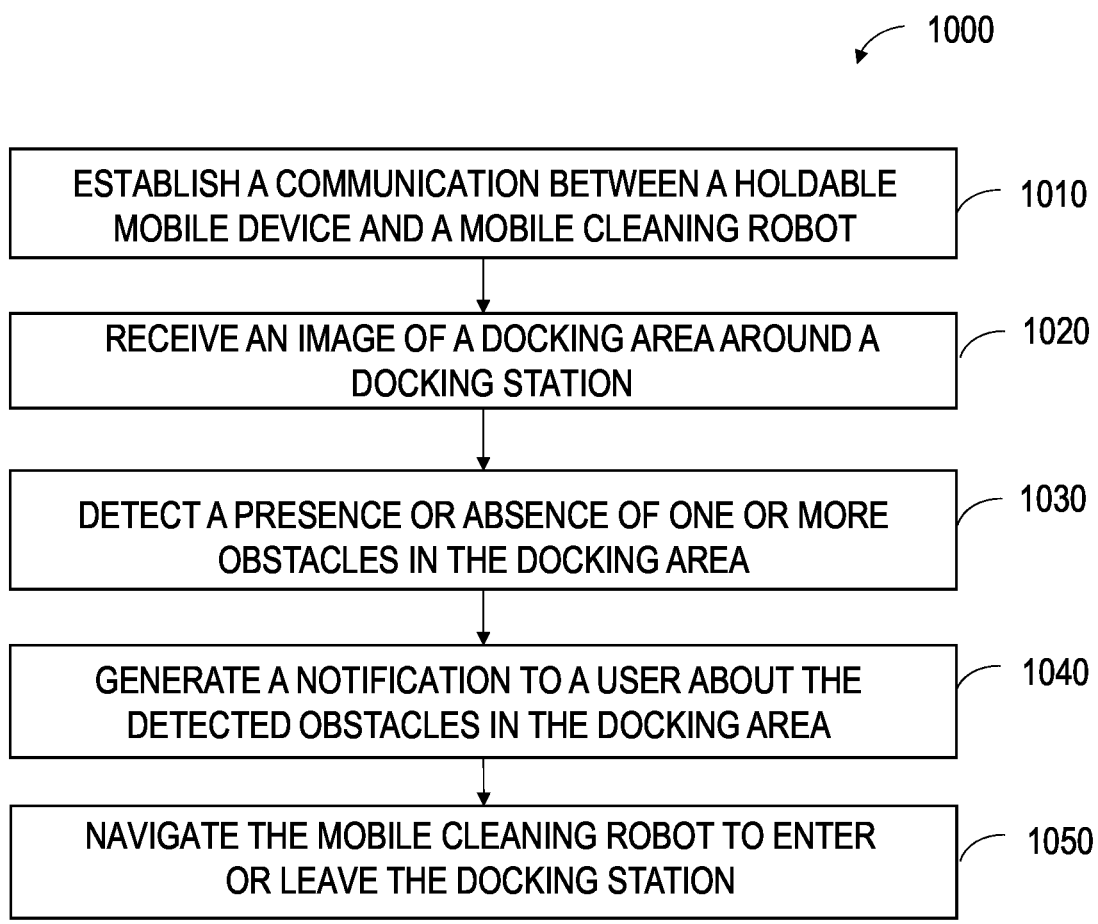
FIG. 10 is a flow diagram illustrating an example of a method for validating dock location for docking a mobile robot.

FIG. 10 is a flow diagram illustrating an example of a method 1000 for validating location around a docking station for docking a mobile robot. The docking station may include components to recharge the battery of the mobile robot and/or to evacuate the debris collected by and temporarily stored in the mobile robot. Examples of the mobile robot may include a mobile cleaning robot, a mobile mopping robot, a lawn mowing robot, or a space-monitoring robot. The method 1000 can be implemented in, and executed by, the mobile robot system 600. At 1010, a communication between a mobile device holdable by a user (such as the mobile device 404 or the mobile device 620) and a mobile robot (such as the mobile robot 100 or the mobile cleaning robot 610) is established. The mobile device can execute device-readable instructions implemented therein, such as a mobile application. The communication between the mobile device and the mobile robot may be via an intermediate system such as the cloud computing system 406, or via a direct communication link without an intermediate device of system. In an example, the mobile device may include a user interface (UI) configured to display robot information and its operating status. A user may manage one or more active mobile robots and coordinate their activities in a mission. In an example, a user may use UI controls to add a new mobile robot such as by establishing a communication between the mobile device and the new mobile robot, or remove an existing mobile robot such as by disconnecting a communication between the mobile device and the existing mobile robot.

At 1020, an image of a docking area around a docking station may be received. Such image may be taken by a camera or an imaging sensor mounted on the mobile device, such as the mobile device 620. The image may be taken when the mobile robot moves to the docking area and when the docking station is within the field of view of the imaging sensor or the camera. Alternatively, the image may be taken when the mobile robot is set to leave the docking station to perform a cleaning mission. In some examples, the image may be taken by the user using the mobile device, or by a camera installed on the environment with a field of view covering the docking area around the docking station.

At 1030, a presence or absence of one or more obstacles in the docking area may be detected from the received image, such as by using the docking environment detector 615. The one or more obstacles, if presented in the docking area, may obstruct or interfere with the mobile cleaning robot from entering or leaving the docking station. Various image-based obstacle detection methods have been contemplated. In an example, one or more obstacles may be detected in the docking area based on a comparison of the image of the docking area and a template image representing unobstructed docking area around the docking station. The template image may be pre-generated and stored in the mobile device, or in the cloud computing system 406 accessible by the mobile cleaning robot and/or the mobile device. In some examples, if an obstacle is detected in the docking area, its location relative to the docking station or a known reference location may be determined based on the comparison to the template image. In some examples, other sensors may additionally or alternatively be used to detect one or more obstacles in the docking area, including, by way of example and not limitation, a bump sensor, an optical sensor, a proximity sensor, or an obstacle sensor, among others.

At 1040, a notification may be generated and presented to the user about the status of the docking area, such as the presence or absence of one or more detected obstacles therein. If one or more obstacles are detected in the docking area, then an indicator of "obstructed docking area" may be provided to the mobile device, and displayed on a user interface thereof. The notification of the obstructed docking area may be presented in a form of a message or other formats of alert. In some examples, a recommendation may be displayed to the user to help resolve the obstructed docking area, such as a recommendation to clear the docking area or to move the docking station to a different location. In some examples, additional information or help on robot docking may be provided to the user, such as in a form of frequently asked questions (FAQs) or a link to a knowledge base such as maintained in the cloud computing system 406.

In some examples, one or more candidate dock locations may be identified automatically, such as using the dock location identification module 629. The identification of the candidate dock locations may be based on heuristics, such as within a specific range of the detected power outlets, near or against a wall, away from corners, away from doorways, away from high traffic areas, away from carpet transitions, close to commonly cleaned areas, and/or away from areas of high occupancy. In some examples, identification of the candidate dock locations may be based on the mobile robot's docking performance around each of candidate location, such as a graph (e.g., a heatmap) representing docking failure rates at various sites around a dock location, as discussed above with reference to FIGS. 9A-9B. In an example, heatmaps may be respectively generated for one or more candidate dock locations. The heatmaps may be displayed on the map of the environment. Docking failure scores may be computed respectively from the heatmaps corresponding to the one or more candidate locations. The mobile device may recommend a candidate dock location corresponds to the smallest docking failure score among the one or more candidate locations for dock placement.

In some examples, an augmented reality (AR) representation of the docking area may be displayed to the user. The AR representation may include a machine-generated virtual bounding box overlaying upon the received image of the docking area. The machine-generated virtual bounding box defines a docking clearance zone around the docking station. The virtual bounding box may be displayed in different colors, render styles, or modes of presentation to visually distinguish an obstructed docking area from an unobstructed docking area, examples of which are illustrated in FIGS. 7A-7C. Notifications, recommendations, and additional docking information may be displayed as part of the AR representation to the user.

In some examples, a wireless communication signal status may be detected in the docking area, such as using the communication signal status detector 628. An example of the wireless communication signal status is a Wi-Fi signal strength. A user may use the mobile device to detect the Wi-Fi signal strength at the docking area, such as during the initial setup of the mobile cleaning robot and the docking station, or after the docking station has been moved to a new location in the environment. The wireless communication signal status, such as Wi-Fi signal strength, may be displayed on the user interface as a part of the AR representation of the docking area, as illustrated in FIGS. 7A-7C. Recommendations to improve the Wi-Fi signal strength (e.g., moving the docking station to a different location) may be presented to the user on the user interface.

At 1050, the mobile cleaning robot may be navigated to enter or leave the docking station based on the detected status of the docking area. If the status of the docking area satisfies a specific condition, such as the docking area or a portion thereof (e.g., the docking lane 550) is free of obstacles obstructing or interfering with the docking process, then the mobile cleaning robot may proceed to enter or leave the docking station. If the docking area does not satisfy the specific condition, such as the docking area or a portion thereof is obstructed by one or more obstacles, and/or if a poor Wi-Fi signal strength is detected at the docking area, then the user may be prompted to correct the situation at the docking area, such as to clear the docking area to provide sufficient spacing around the docking station, or to move the docking station to an alternative location with sufficient spacing and/or stronger Wi-Fi signal strength. The docking area may then be re-evaluated. Once validated for satisfying the specific condition (e.g., unobstructed docking area and sufficient Wi-Fi coverage in the area), the mobile cleaning robot may proceed to enter or leave the docking station automatically or upon receiving a confirmation by the user.

Examples of Machine-Readable Medium for Robot Scheduling and Controlling

Figure 11:
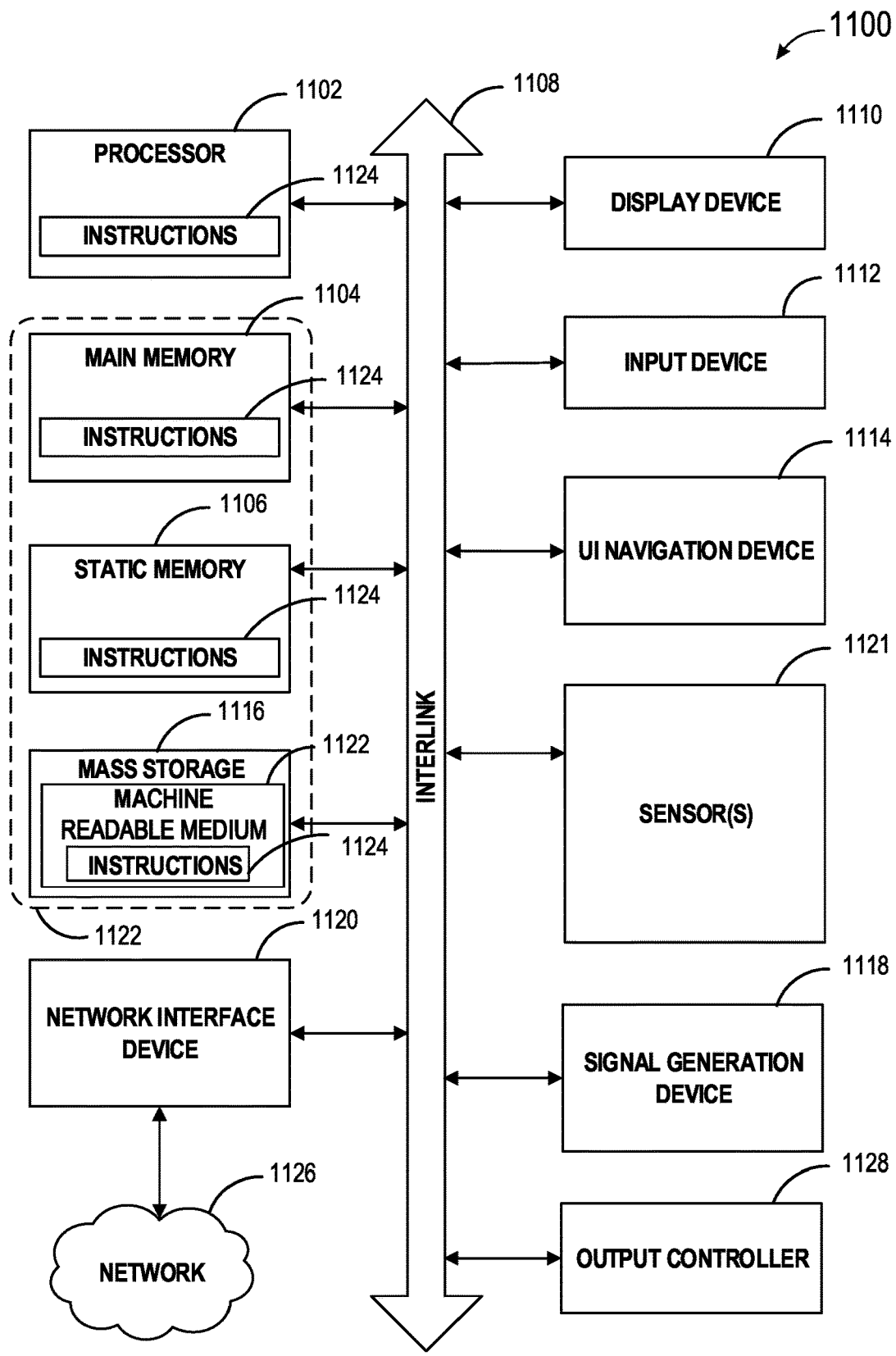
FIG. 11 is a block diagram illustrating an example machine upon which any one or more of the techniques (e.g., methodologies) discussed herein may perform.

FIG. 11 illustrates generally a block diagram of an example machine 1100 upon which any one or more of the techniques (e.g., methodologies) discussed herein may perform. Portions of this description may apply to the computing framework of various portions of the mobile robot 100, the mobile device 404, or other computing system such as a local computer system or the cloud computing system 406.

In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110 (e.g., a raster display, vector display, holographic display, etc.), an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensors. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine-readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 1124 may further be transmitted or received over a communication network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communication network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

Various embodiments are illustrated in the figures above. One or more features from one or more of these embodiments may be combined to form other embodiments.

The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should therefore be determined with references to the appended claims, along with the full scope of equivalents to which such claims are entitled.

What is claimed is:

1. A mobile robot system, comprising:
   a docking station;
   a mobile cleaning robot, including a drive system configured to drive the mobile cleaning robot in an environment and to dock the mobile cleaning robot to the docking station; and
   a user controller device in operative communication with the mobile cleaning robot, the user controller device configured to:
      determine docking failure rates respectively for a plurality of sites in the environment when one or more of said plurality of sites are obstructed by obstacles;
      identify at least one candidate dock location in the environment for placing the docking station based on the determined docking failure rates for the plurality of sites;
      present the identified at least one candidate dock location on a user interface; and
      generate, and display on the user interface, a graphical representation of the determined docking failure rates across the plurality of sites in the environment.

2. The mobile robot system of claim 1, wherein the user controller device is configured to determine the docking failure rates using docking data from multiple docking instances in the environment by the mobile cleaning robot or one or more mobile robots other than the mobile cleaning robot.

3. The mobile robot system of claim 1, wherein to determine the docking failure rates includes to determine, for each of the plurality of sites, a differential docking failure rate using a difference between (i) a first docking failure rate when a corresponding site is unobstructed and (ii) a second docking failure rate when the corresponding site is obstructed,
   wherein the user controller device is configured to identify the at least one candidate dock location from one or more of the plurality of sites with the corresponding differential docking failure rates falling below a threshold.

4. The mobile robot system of claim 1, wherein the user controller device is further configured to:
   based on the docking failure rates for the plurality of sites, identify one or more subareas in the environment with distinct docking failure risk levels, the one or more subareas each including one or more of the plurality of sites; and
   present the identified one or more subareas on the user interface.

5. The mobile robot system of claim 4, wherein the identified one or more subareas include a dock avoidance area,
   wherein the user controller device is configured to generate a recommendation to avoid placing the docking station at the identified dock avoidance area.

6. The mobile robot system of claim 4, wherein the user controller device is further configured to generate, based on the identified one or more subareas, a recommendation to clear an obstruction in a docking area with respect to the docking station.

7. The mobile robot system of claim 1, wherein the at least one candidate dock location includes two or more candidate dock locations, and wherein the user controller device is further configured to:
- compute docking failure scores respectively for the two or more candidate dock locations based on the docking failure rates for the plurality of sites; and
- determine, from the two or more candidate dock locations, a recommended dock location with a corresponding docking failure score satisfying a specific condition.

8. The mobile robot system of claim 1, wherein the user controller device is configured to:
- identify a subarea of the environment based on one or more of an amount of traffic, an occupancy status, a surface condition, or an accessibility; and
- determine the candidate dock location in the identified subarea of the environment based on the docking failure rates for the plurality of sites.

9. The mobile robot system of claim 1,
- wherein the mobile cleaning robot includes a sensor system configured to detect a presence or absence of an obstacle in a docking area with respect to the docking station,
- wherein the user controller device is configured to, in response to the detected presence of the obstacle in the docking area, generate a recommendation to reposition the docking station at the candidate dock location.

10. The mobile robot system of claim 9, wherein the sensor system includes at least one of an imaging sensor, a bump sensor, an optical sensor, a proximity sensor, or an obstacle sensor.

11. A mobile robot system, comprising:
- a docking station;
- a mobile cleaning robot, including a drive system configured to drive the mobile cleaning robot in an environment and to dock the mobile cleaning robot to the docking station; and
- a user controller device in operative communication with the mobile cleaning robot, the user controller device configured to:
  - receive a user input of a designated subarea of the environment;
  - determine docking failure rates respectively for a plurality of sites in the designated subarea when one or more of said plurality of sites are obstructed by obstacles;
  - identify at least one candidate dock location in the designated subarea for placing the docking station based on the determined docking failure rates for the plurality of sites; and
  - present the identified at least one candidate dock location on a user interface.

12. A method of controlling a mobile cleaning robot to dock at a docking station in an environment via a user controller device, the method comprising:
- receiving docking data from multiple docking instances in the environment by the mobile cleaning robot or one or more mobile robots other than the mobile cleaning robot;
- determine, using the received docking data, docking failure rates respectively for a plurality of sites in the environment when one or more of said plurality of sites are obstructed by obstacles;
- identifying, via the user controller device, at least one candidate dock location in the environment for placing the docking station based on the determined docking failure rates for the plurality of sites;
- presenting the identified at least one candidate dock location to a user on a user interface of the user controller device;
- generating, and displaying on the user interface, a graphical representation of the determined docking failure rates across the plurality of sites in the environment; and
- generating a control signal to the mobile cleaning robot to dock at the docking station.

13. The method of claim 12,
- wherein determining the docking failure rates includes determining, for each of the plurality of sites, a differential docking failure rate using a difference between (i) a first docking failure rate when a corresponding site is unobstructed and (ii) a second docking failure rate when the corresponding site is obstructed,
- wherein identifying the at least one candidate dock location includes identifying one or more of the plurality of sites with the corresponding differential docking failure rates falling below a threshold.

14. The method of claim 12, comprising:
- based on the docking failure rates for the plurality of sites, identifying one or more subareas in the environment with distinct docking failure risk levels, the one or more subareas each including one or more of the plurality of sites; and
- presenting the identified one or more subareas on the user interface.

15. The method of claim 14, wherein the identified one or more subareas include a dock avoidance area, the method further comprising generating a recommendation to avoid placing the docking station at the identified dock avoidance area.

16. The method of claim 12, comprising generating, and displaying on the user interface, a graphical representation of the determined docking failure rates across the plurality of sites in the environment.

17. The method of claim 12, wherein the at least one candidate dock location includes two or more candidate dock locations, the method further comprising:
- computing docking failure scores respectively for the two or more candidate dock locations based on the docking failure rates for the plurality of sites; and
- determining, from the two or more candidate dock locations, a recommended dock location with a corresponding docking failure score satisfying a specific condition.

18. The method of claim 12, comprising:
- identifying a subarea based on one or more of an amount of traffic, an occupancy status, a surface condition, or an accessibility in at least a portion of the environment; and
- determining the candidate dock location in the identified subarea of the environment based on the docking failure rates for the plurality of sites.

19. The method of claim 12, comprising:
- detecting a presence or absence of an obstacle in a docking area with respect to the docking station using a contact sensor or an imaging sensor associated with the mobile cleaning robot; and
- in response to the detected presence of the obstacle in the docking area, generating a recommendation to place the docking station at the candidate dock location.

20. The method of claim 12, comprising:
receiving a user input of a designated subarea of the environment; and
determining the candidate dock location in the designated subarea of the environment based on the docking failure rates for the plurality of sites.

* * * * *